United States Patent
Lopez et al.

(10) Patent No.: US 11,201,775 B2
(45) Date of Patent: Dec. 14, 2021

(54) TECHNIQUE FOR BACKSCATTERING TRANSMISSION

(71) Applicant: Telefonaktiebolaget LM Ericsson (publ), Stockholm (SE)

(72) Inventors: Miguel Lopez, Solna (SE); Leif Wilhelmsson, Lund (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/969,785

(22) PCT Filed: Feb. 14, 2018

(86) PCT No.: PCT/EP2018/053704
§ 371 (c)(1),
(2) Date: Aug. 13, 2020

(87) PCT Pub. No.: WO2019/158196
PCT Pub. Date: Aug. 22, 2019

(65) Prior Publication Data
US 2020/0412591 A1    Dec. 31, 2020

(51) Int. Cl.
*H04L 27/26* (2006.01)
*H04B 5/00* (2006.01)
*G01S 13/75* (2006.01)

(52) U.S. Cl.
CPC ....... *H04L 27/2628* (2013.01); *H04B 5/0031* (2013.01); *G01S 13/756* (2013.01)

(58) Field of Classification Search
CPC ..... H04L 27/2628; H04L 27/00; H04L 27/26; H04L 27/2601; H04L 27/2626–2628;
(Continued)

(56) References Cited

U.S. PATENT DOCUMENTS 6,084,530 A * 7/2000 Pidwerbetsky ....... G01S 13/825
                                                       340/10.1
7,030,761 B2 * 4/2006 Bridgelall ................ G01S 5/14
                                                       340/538.11
(Continued)

FOREIGN PATENT DOCUMENTS

EP            1 995 683 A1    11/2008

OTHER PUBLICATIONS

International Search Report and Written Opinion issued in International Application No. PCT/EP2018/053704 dated Oct. 30, 2018 (11 pages).

(Continued)

*Primary Examiner* — James M Perez
(74) *Attorney, Agent, or Firm* — Rothwell, Figg, Ernst & Manbeck, P.C.

(57) ABSTRACT

A technique for transmitting data from a passive radio device (100) is described. As to a method aspect of the technique, an antenna (102) of the passive radio device (100) is exposed to an incident radio signal (502). A frequency domain representation of the incident radio signal (502) comprised at least one muted gap between active subcarriers within a bandwidth of the incident radio signal (502). The incident radio signal (502) is backscattered from the antenna by modulating an impedance of the antenna according to the data using at least two different modulation frequencies that differ by less than the bandwidth.

18 Claims, 15 Drawing Sheets

US 11,201,775 B2
Page 2

(58) Field of Classification Search
CPC ...... H04B 5/0031; H04B 5/00; H04B 5/0025; G01S 13/00; G01S 13/74–75; G01S 13/751; G01S 13/756; G01S 13/758
See application file for complete search history.

(56) References Cited

U.S. PATENT DOCUMENTS

| | | | | |
|---|---|---|---|---|
| 7,091,828 | B2* | 8/2006 | Greeff | G01S 13/751 340/10.3 |
| 7,796,016 | B2* | 9/2010 | Fukuda | G06K 19/0723 340/10.4 |
| 8,633,805 | B2* | 1/2014 | Tuttle | G06K 7/10019 340/10.1 |
| 8,709,872 | B2* | 4/2014 | Rofougaran | H01Q 1/2283 438/109 |
| 9,030,301 | B2* | 5/2015 | Tuttle | G06K 7/10316 340/10.4 |
| 9,742,466 | B2* | 8/2017 | Mukherjee | H04B 1/16 |
| 10,079,616 | B2* | 9/2018 | Reynolds | G06K 19/0723 |
| 10,461,783 | B2* | 10/2019 | Reynolds | H04B 5/0031 |
| 10,652,073 | B2* | 5/2020 | Talla | H04L 27/0002 |
| 10,693,521 | B2* | 6/2020 | Reynolds | H04W 4/80 |
| 10,812,130 | B2* | 10/2020 | Talla | H04L 5/1461 |
| 10,852,416 | B2* | 12/2020 | Sundaresan | G01S 13/751 |
| 10,873,363 | B2* | 12/2020 | Gollakota | H04Q 5/22 |
| 10,921,419 | B2* | 2/2021 | Ma | G01S 13/06 |
| 10,936,927 | B2* | 3/2021 | Sundaresan | G06K 7/01 |
| 11,012,278 | B2* | 5/2021 | Lopez | H04L 27/2697 |
| 11,038,571 | B2* | 6/2021 | Lopez | H04B 5/0031 |
| 11,070,414 | B2* | 7/2021 | Lopez | H04W 72/0453 |
| 2007/0001813 | A1* | 1/2007 | Maguire | G06K 7/10356 340/10.2 |
| 2008/0009257 | A1* | 1/2008 | Safarian | H04B 17/21 455/307 |
| 2008/0315996 | A1* | 12/2008 | Domokos | G06K 7/0008 340/10.1 |
| 2010/0286522 | A1* | 11/2010 | Beach | A61B 8/08 600/441 |
| 2012/0050016 | A1* | 3/2012 | Bieber | G01S 13/878 340/10.1 |
| 2013/0023210 | A1* | 1/2013 | Rofougaran | H01L 23/66 455/41.1 |
| 2013/0265140 | A1* | 10/2013 | Gudan | G06K 19/071 340/10.3 |
| 2013/0338479 | A1* | 12/2013 | Pogue | G16H 30/40 600/408 |
| 2015/0091706 | A1* | 4/2015 | Chemishkian | H02J 50/20 340/10.34 |
| 2015/0229133 | A1* | 8/2015 | Reynolds | H04B 7/0413 307/24 |
| 2016/0329931 | A1* | 11/2016 | Mukherjee | H04B 5/0012 |
| 2016/0365890 | A1* | 12/2016 | Reynolds | G06K 19/0723 |
| 2017/0353055 | A1* | 12/2017 | Han | H02J 7/025 |
| 2018/0375703 | A1* | 12/2018 | Kellogg | H04L 5/0007 |
| 2019/0068236 | A1* | 2/2019 | Reynolds | H04B 1/10 |
| 2019/0158341 | A1* | 5/2019 | Talla | H04L 27/26 |
| 2019/0207642 | A1* | 7/2019 | Reynolds | H04B 1/10 |
| 2019/0326970 | A1* | 10/2019 | Ma | H04B 7/0617 |
| 2020/0059266 | A1* | 2/2020 | Daga | H04B 5/0031 |
| 2020/0212956 | A1* | 7/2020 | Gollakota | H04W 74/0808 |
| 2020/0236571 | A1* | 7/2020 | Lopez | H04L 27/2042 |
| 2020/0259527 | A1* | 8/2020 | Lopez | H04J 13/0048 |
| 2020/0266673 | A1* | 8/2020 | Reynolds | H02J 50/80 |
| 2020/0313939 | A1* | 10/2020 | Lopez | H04L 27/2626 |
| 2020/0412591 | A1* | 12/2020 | Lopez | G01S 13/75 |
| 2021/0006445 | A1* | 1/2021 | Lopez | H04L 27/2602 |
| 2021/0012071 | A1* | 1/2021 | Lopez | H04W 4/38 |
| 2021/0084251 | A1* | 3/2021 | Gollakota | H04L 25/4902 |
| 2021/0099198 | A1* | 4/2021 | Reynolds | H04B 5/0056 |
| 2021/0099331 | A1* | 4/2021 | Lopez | H04L 27/2637 |
| 2021/0135721 | A1* | 5/2021 | Lopez | H04B 7/0617 |

OTHER PUBLICATIONS

Bryce Kellogg et al., "Passive Wi-Fi: Brining Low Power to Wi-Fi Transmissions", GetMobile, vol. 20, Issue 3, New York, NY, Jul. 2016 (4 pages).

Kellogg, "Passive Wi-Fi: Brining Low Power to Wi-Fi Transmissions", GetMobile, vol. 20, Issue 3, New York, NY, (Jul. 2016) (4 pages).

Zhang, "Enabling Practical Backscatter Communication for On-body Sensors", ACM SIGCOMM 2016 Conference, New York NY, (Aug. 2016) (14 pages).

Kellogg, "Passive Wi-Fi: Bringing Low Power to Wi-Fi Transmissions," Proceedings of the 13th USENIX Symposium on Networked Systems Design and Implementation (NSDI '16) (Mar. 2016) (15 pages).

* cited by examiner

100

200

1700

1800 ns", 13th USENIX Symposium on Networked Systems Design and Implementation, USENIX Association; J. F. Ensworth, et al., "Every smart phone is a backscatter reader: Modulated backscatter compatibility with Bluetooth 4.0 Low Energy (BLE) devices", 2015 IEEE International Conference on RFID; and Reynolds et al., US 2016/0365890 A1 highlight the potential of semi-passive and passive transmitters in Internet of Things (IoT) applications. More specifically, the document US 2016/0365890 A1 describes a backscattering device for transmitting a backscattered radio signal that is formatted in accordance with a wireless communications protocol, so that the backscattered radio signal is receivable by existing broadband devices as if the backscattering device were generating the radio signal.

TECHNIQUE FOR BACKSCATTERING TRANSMISSION

CROSS REFERENCE TO RELATED APPLICATION(S)

This application is a 35 U.S.C. § 371 National Stage of International Patent Application No. 371 of PCT/EP2018/053704, filed Feb. 14, 2018, designating the United States.

TECHNICAL FIELD

The present disclosure generally relates to a radio transmission technique using backscattering. More specifically, methods and devices are provided for transmitting data from a passive radio device and for receiving such data.

BACKGROUND

Passive transmitters are powered entirely by the energy received from an incoming radio frequency signal. Semi-passive transmitters have a battery and consume power to perform baseband processing, but lack a power amplifier and many other components present in a radio frequency chain of an active transmitter. Thus, both passive and semi-passive transmitters are power-efficient. Conventional passive transmitters, such as tags for radio-frequency identification (RFID), modulate the incoming radio frequency signal by Amplitude Shift Keying (ASK) for proximity and vicinity coupling.

For transmitting at higher data rates and for communicating with broadband devices, the passive transmitters can modulate the data on multiple subcarriers. B. Kellogg et al., "Passive Wi-Fi: Bringing Low Power to Wi-Fi Transmissio However, conventional backscattering techniques frequency-modulate isolated frequency components of the incoming radio signal. Thus, these incoming radio signals have highly concentrated spectral densities and sources of powerful narrowband interference. Furthermore, the signal to noise and interference ratio (SNIR) of the backscattered radio signal can strongly vary with the spatial arrangement of the generator for the incoming radio signal, the passive transmitter of the backscattered radio signal and the receiver of the backscattered radio signal. Hence, it can be difficult to reliably demodulate the backscattered radio signal using conventional receivers designed for popular radio access technologies such as Wi-Fi. On the other hand, it is desirable to re-use hardware platforms among various radio technologies in order to reduce production costs and accelerate time to market, and in particular it is desirable to incorporate radios that are designed for technologies such as Wi-Fi or Bluetooth into radio access networks in which backscattering devices operate.

SUMMARY

Accordingly, there is a need for a backscattering radio communication technique that allows improving or controlling bandwidth utilization efficiency and/or reliability. Alternatively or in addition, there is a need for a backscattering radio communication technique that allows reusing radio platforms designed primarily for non-scattering communications.

As to one method aspect, a method of transmitting data from a passive radio device is provided. The method may comprise or initiate a step of exposing an antenna of the passive radio device to an incident radio signal. A frequency domain representation of the incident radio signal may comprise at least one muted gap between active subcarriers within a bandwidth of the incident radio signal. The method may further comprise or initiate a step of backscattering the incident radio signal from the antenna by modulating an impedance of the antenna according to the data using at least two different modulation frequencies that differ by less than the bandwidth.

Embodiments of the technique can increase bandwidth utilization efficiency and/or increase transmission reliability. By increasing the number of modulation frequencies, the bandwidth utilization efficiency can be increased. For example, by defining one or more muted gaps that are wider in the frequency domain representation than the highest modulation frequency, a plurality of different modulation frequencies can be reliably demodulated. Alternatively or in addition, by increasing the number of muted gaps and active subcarriers, the increased bandwidth utilization can further increase transmission reliability, e.g., decrease a bit error rate for a given signal to noise ratio or a given signal to noise and interference ratio). Based on an energy received in the at least one muted gap, an energy threshold value can be defined for reliably detecting the active subcarriers in the backscattered radio signal. Moreover, by defining a complex and/or non-periodic pattern of active subcarriers and muted gaps in the incident radio signal, the different modulation frequencies (e.g., many fractions of the bandwidth of the incident radio signal) can be reliably demodulated.

By modulating the impedance of the antenna using the at least two different modulation frequencies, the backscattered signal may be frequency-shifted relative to the incident radio signal by the at least two different modulation frequencies. By using modulation frequencies that differ (e.g., vary) by less than the bandwidth, the backscattered signal may be demodulated based on the frequency-shifted active subcarriers, the frequency-shifted at least one muted gap or a combination thereof. The backscattered signal may be demodulated within a bandwidth that is equal to or less than the bandwidth of the incident radio signal.

The "passive radio device" may encompass any radio device comprising the antenna without an associated antenna amplifier or without amplifying a baseband signal for transmitting the data by means of the backscattering. The passive radio device implementing the method may also be referred to as a data transmitter.

The passive radio device may comprise a baseband circuit. The baseband circuit may be driven by radio-induced energy (which may be referred to as strictly passive), by a local energy source (e.g., a solar cell or a battery) or by local energy harvesting (which may be referred to as semi-passive). For example, the passive radio device is not configured for generating a radio signal. Herein, generating a radio signal may encompass converting electrical energy into an electromagnetic wave. For example, the passive radio device comprises no power amplifier, no up-converter and/or no radio frequency chain.

The modulation frequencies may differ by less than the bandwidth of the incident radio signal if the difference or a maximum of the differences between the modulation frequencies is less than the bandwidth. The modulation frequencies may differ by less than the bandwidth of the incident radio signal if the difference between a maximum of the modulation frequencies and a minimum of the modulation frequencies is less than the bandwidth of the incident radio signal.

The active subcarriers may define the bandwidth of the incident radio signal. The bandwidth of the incident radio signal may correspond to the (e.g., minimum) frequency interval comprising the active subcarriers. The bandwidth of the incident radio signal may be the difference between the highest frequency and the lowest frequency among the active subcarriers. The bandwidth of the incident radio signal may also be referred to as incident radio signal bandwidth.

The active subcarrier may be any an energized subcarrier. The active subcarrier may be any subcarrier modulated by a non-zero amplitude. A power spectral density may be non-zero or greater than a noise power density at each of the active subcarriers. A power spectral density may be zero or may correspond to a noise power density in each of the muted gaps.

Each of the active subcarriers may have a subcarrier bandwidth, e.g., defined by a baud rate of the data transmission. Each of the at least one muted gap may extend in the frequency domain representation (e.g., at least) over a gap bandwidth.

The frequency domain representation of the incident radio signal may comprise at least two muted gaps within the bandwidth of the incident radio signal.

The different power spectral densities at the active subcarriers and the muted gaps may enable a receiver to reliably demodulate the backscattered signal. A plurality of muted gaps may provide a plurality of edges between the active subcarriers and the muted gaps, based on which the receiver may be enabled to locate the frequency-shifted power spectral density in the frequency domain and, thus, to determine the used modulation frequency.

The incident radio signal may comprise at least one group of adjacent active subcarriers. Each of the least one group of adjacent active subcarriers may be separated from any other active subcarrier that is not in the corresponding group by at least one muted gap.

The modulation frequencies may differ by more than a group bandwidth of the at least one group. For example, the group bandwidth of the at least one group may be less than the difference between the modulation frequencies or less than a maximum of the differences between the modulation frequencies.

The modulation frequencies may vary to such an extent that the images of the at least one group of adjacent active subcarriers, as shifted by the modulation frequencies in the backscattered radio signal, do not overlap with themselves for at least one of the modulation frequencies. Alternatively or in addition, the different images resulting from a pair of different modulation frequencies do not overlap.

The group bandwidth may be the bandwidth of the group of adjacent active subcarriers within the bandwidth of the incident radio signal or the maximum of the bandwidths of the groups of adjacent active subcarriers within the bandwidth of the incident radio signal. In other words, the group bandwidth may be the maximum bandwidth among the group bandwidths of each of the groups of adjacent active subcarriers within the bandwidth of the incident radio signal.

Herein, the adjacent active subcarriers may be contiguous active subcarriers. Alternatively or in addition, a group of adjacent active subcarriers may comprise two or more active subcarriers without a muted gap between the adjacent active subcarriers of the group.

The gap bandwidth may be equal to or greater than the subcarrier bandwidth. In other words, a first active subcarriers and a second active subcarrier may be adjacent active subcarriers if no third subcarrier fits between the first and second active subcarriers without overlapping (e.g., in terms of the subcarrier bandwidth) with the first and second active subcarriers. The muted gap may relate to a frequency interval between two neighboring and not adjacent active subcarriers.

The method may further comprise or initiate a step of measuring the group bandwidth in the incident radio signal. The method may further comprise or initiate a step of selecting the modulation frequencies according to the measured group bandwidth.

The modulation frequencies may differ by less than a gap bandwidth of the at least one muted gap. For example, the gap bandwidth of the at least one muted gap may be greater than a maximum difference of the modulation frequencies, i.e., the difference between the highest modulation frequency and the lowest modulation frequency.

In the case of at least two muted gaps, each of the muted gaps may have the same gap bandwidth. Alternatively, the gap bandwidth may be the minimum bandwidth (or the maximum bandwidth) among the gap bandwidths of each of the muted gaps between the active subcarriers within the bandwidth of the incident radio signal.

The method may further comprise or initiate a step of measuring the gap bandwidth in the incident radio signal. The method may further comprise or initiate a step of selecting the modulation frequencies according to the measured gap bandwidth.

The incident radio signal may comprise at least two sets of active subcarriers. The sets may be separated in the frequency domain representation by the at least one muted gap. The sets of active subcarriers may comprise the one or more groups of adjacent active subcarriers and/or may comprise one or more isolated active subcarriers. An active subcarrier may be an isolated active subcarrier if the active subcarrier is separated from any other active subcarrier by at least of muted gap. In other words, an active subcarrier may be an isolated active subcarrier if the active subcarrier has no adjacent active subcarrier.

Each of the active subcarriers in the incident radio signal may correspond to a different subcarrier on a subcarrier frequency raster with uniform subcarrier spacing. The subcarrier frequency raster with uniform subcarrier spacing may be any regular arrangement, grid or lattice of subcarriers in the frequency domain representation.

The subcarrier spacing may correspond to the difference in the (e.g., center) frequencies of adjacent active subcarriers, i.e., neighboring active subcarriers within the same set of adjacent active subcarriers. Each of the active subcarriers may have its (e.g., center) frequency arranged on the subcarrier frequency raster. The subcarrier spacing may be equal to or (e.g., slightly) greater than the subcarrier bandwidth.

Alternatively or in addition, two adjacent active subcarriers may correspond to directly neighboring subcarriers on the subcarrier frequency raster. In other words, two active subcarriers are adjacent, if there is no further subcarrier in between them according to the subcarrier frequency raster. The (e.g., center) frequencies of two adjacent active subcarriers may correspond to directly neighboring frequencies on the subcarrier frequency raster. For example, the frequencies of adjacent subcarriers may correspond to frequencies $k \cdot \Delta F$ and $(k+1) \cdot \Delta F$, wherein k is an integer number and $\Delta F$ is the subcarrier spacing.

Each of the muted gaps may correspond to at least one (e.g., muted) subcarrier on the subcarrier frequency raster. Each of the muted gaps may correspond to a subset on the subcarrier frequency raster (gap subset). The gap subsets may be separated on the subcarrier frequency raster by the sets of active subcarriers.

Each of the sets of adjacent active subcarriers may correspond to a subset on the subcarrier frequency raster. The sets may be separated on the subcarrier frequency raster by the muted gaps. The group subsets and the sets may be complementary subsets on the subcarrier frequency raster. Each of the active subcarriers and each of the muted gaps of the incident radio signal may correspond to at least one subcarrier on the subcarrier frequency raster.

One of the modulation frequencies may be equal to the subcarrier spacing. Alternatively or in addition, all (or all but one) of the modulation frequencies may be equal to or greater than the subcarrier spacing.

Each of the at least two different modulation frequencies may be an integer multiple of the subcarrier spacing. Alternatively or in addition, each pair of the at least two different modulation frequencies may differ by an integer multiple of the subcarrier spacing. Each of the modulation frequencies may have a common offset that is or is not an integer multiple of the subcarrier spacing.

The integer multiples may include at least one of zero (0) and one (1). Each of the at least two different modulation frequencies may correspond to a common offset frequency plus an integer multiple of the subcarrier spacing. The common offset frequency may be common (i.e., the same) for all modulation frequencies. The common offset frequency may be zero.

Each of the at least one muted gap in the incident radio signal may correspond to M or at least M (e.g., adjacent) muted subcarriers on the subcarrier frequency raster. Each of the at least two sets of active subcarriers in the incident radio signal may comprise at most M active subcarriers (e.g., on the subcarrier frequency raster). M may be a natural number. The gap bandwidth may be M times the subcarrier spacing, e.g., $BW_{gap} = \Delta F \cdot M$.

A frequency component corresponding to a muted gap in the backscattered radio signal resulting from one of the modulation frequencies may comprise an active subcarrier in the backscattered radio signal resulting from another one of the modulation frequencies. That is, a frequency domain representation of the backscattered radio signal shifted by one of the modulation frequencies comprises active frequency components in the muted gaps of the backscattered radio signal shifted by another one of the modulation frequencies.

For any pair of first and second modulation frequencies among the at least two different modulation frequencies, there may be at least one frequency component that is active in the backscattered radio signal resulting from the first modulation frequency and muted in the backscattered radio signal resulting from the second modulation frequency.

For each of the at least two different modulation frequencies, all frequency components that are active in the backscattered radio signal resulting from using the corresponding modulation frequency may be muted in the backscattered radio signal resulting from using any other of the at least two different modulation frequencies. All subcarriers on the subcarrier frequency raster that are active in the backscattered radio signal when the modulation uses one of the modulation frequencies may be muted when using any other of the modulation frequencies. In other words, the active frequency components in the backscattered radio signals resulting from the different modulation frequencies may be disjoint.

The backscattered radio signal may overlap in the frequency domain representation with the bandwidth of the incident radio signal. Each of the modulation frequencies may be equal to or less than the bandwidth of the incident radio signal. All of the modulation frequencies may be less than the bandwidth of the incident radio signal. The resulting backscattering may also be referred to as in-band backscattering.

The at least two different modulation frequencies may comprise M/2 or at most M/2 different modulation frequencies. For in-band backscattering, both the positive frequency components (i.e., the image at higher frequencies) and the negative frequency components (i.e., the image at lower frequencies) of each active subcarrier may fall within the at least one muted gap of the unshifted or incident radio signal. By using M/2 or less different modulation frequencies, the different images backscattered by using different modulation frequencies may be without overlap, e.g. for a more reliable demodulation.

One of the at least two different modulation frequencies may zero.

Alternatively or selectively, the backscattered radio signal may be shifted in the frequency domain representation out of the bandwidth of the incident radio signal. Each of the at least two different modulation frequencies may be equal to or greater than the bandwidth. All of the modulation frequencies may be greater than the bandwidth of the incident radio signal. The resulting backscattering may also be referred to as out-of-band backscattering.

The at least two different modulation frequencies may comprise at most M different modulation frequencies. Alternatively or in addition, the at least two different modulation frequencies may comprise at least M/2 different modulation frequencies. For out-of-band backscattering, both positive frequency components and negative frequency components (e.g., observable in the backscattered radio signal as respective images) of each active subcarrier in the incident radio signal may fall in separate radio frequency bands. Even if more than M/2 modulation frequencies are used, all different modulation frequencies may be distinguishable or demodulatable.

The backscattered radio signal may comprise a lower sideband and an upper sideband shifted in the frequency domain representation relative to the incident radio signal. Each of the sidebands may comprise a frequency-shifted image of the incident radio signal, i.e., of the active subcarriers and the at least one muted gap, which is shifted by the modulation frequency used for the modulation. The lower sideband may result from subtracting the modulation frequency from frequencies of the active subcarriers in the incident radio signal. The upper sideband may result from adding the modulation frequency from frequencies of the active subcarriers in the incident radio signal.

In any embodiment, the backscattered radio signal may be shifted in the frequency domain relative to the incident radio signal by the modulation frequency used for the modulation. Each of the modulation frequencies may correspond to a different modulation symbol or data symbol (briefly: symbol). A sequence of the symbols may be representative of the data.

The incident radio signal may be an orthogonal frequency modulation (OFDM) signal (e.g., on the subcarrier frequency raster). Data symbols in the backscattered radio signal and OFDM symbols in the incident radio signal may be synchronized.

The technique may be implemented at and/or performed by one or more passive radio devices. For example, a cell of a radio access network (RAN) may serve a plurality of passives radio devices each implementing the technique.

A further method aspect may relate to generating a radio signal incident to a passive radio device. The incident radio signal may be an OFDM signal comprising a plurality of subcarriers on a subcarrier frequency raster with a uniform subcarrier spacing. The incident radio signal may comprise sets of active subcarriers separated by muted gaps from each other. Each of the muted gaps in the incident radio signal may correspond to M or at least M adjacent subcarriers. Each of the sets in the incident radio signal may comprise one active subcarrier or at most M active adjacent subcarriers.

Generating the incident radio signal may comprise at least one of performing an inverse Fourier transform for generating a baseband signal, up-converting the baseband signal and amplifying the up-converted signal. At least one of the inverse Fourier transform, the up-conversion and the amplification may be driven by an external power source.

As to another method aspect, a method of receiving data from a passive radio device is provided. The method may comprise or initiate a step of receiving a backscattered radio signal from an antenna of the passive radio device that is exposed to an incident radio signal. A frequency domain representation of the incident radio signal may comprise at least one muted gap between active subcarriers within a bandwidth of the incident radio signal. The backscattered radio signal may be frequency modulated according to the data using at least two different modulation frequencies that differ by less than the bandwidth.

The backscattered radio signal may be received responsive to exposing the antenna to the incident radio signal. Herein, "responsive to exposing" may encompass "while exposing" and/or "after exposing".

The method may further comprise or initiate a step demodulating the backscattered radio signal. The demodulation may include a correlation of the backscattered radio signal with at least two power spectral densities. Each of the power spectral densities may be associated with a different one of the at least two modulation frequencies. A maximum among the correlations may indicate the used modulation frequency.

Alternatively or in addition, the method may further comprise or initiate at least one of the following steps. The backscattered radio signal may be demodulated including a Fourier transformation of the backscattered radio signal. The Fourier transformation may result in a plurality of frequency components. Power over each of at least two disjoint sets of the frequency components may be accumulated. The used modulation frequency may be determined based on the set of subcarriers with maximum accumulated power among the at least two sets.

Each of the frequency components resulting from the Fourier transformation may correspond to a different one of the subcarriers on the subcarrier frequency raster. The Fourier transformation may be implemented by a discrete Fourier transform (DFT), e.g., after sampling the received backscattered radio signal.

Each of the at least two disjoint sets of the frequency components may comprise, or correspond to, the active subcarriers shifted according to a different one of the at least two different modulation frequencies.

The other method aspect may further comprise or initiate one or more steps or may comprise one or more features of the one method aspect, or a step or feature corresponding thereto.

The other method aspect may be implemented at and/or performed by a receiving device, e.g., an active radio device, an access point (AP) and/or a RAN serving one or more passive radio devices. The AP may encompass any station that is configured to provide radio access to radio devices, e.g., the passive radio device.

In any aspect, the active radio device and/or the passive radio device may be configured for peer-to-peer communication (e.g., on a sidelink) and/or for accessing the RAN (e.g. on an uplink and/or a downlink). The active radio device and/or the passive radio device may be a user equipment (UE, e.g., a 3GPP UE), a mobile or portable station (STA, e.g. a Wi-Fi STA), a device for machine-type communication (MTC), a device for narrowband Internet of Things (NB-IoT) or a combination thereof. Examples for the UE and the mobile station include a mobile phone and a tablet computer. Examples for the portable station include a laptop computer and a television set. Examples for the MTC device or the NB-IoT device include robots, sensors and/or actuators, e.g., in manufacturing, automotive communication and home automation. The MTC device or the NB-IoT device may be implemented in household appliances and consumer electronics. Examples for the combination include a self-driving vehicle, a door intercommunication system and an automated teller machine.

Examples for the AP may include a 3G base station or Node B, 4G base station or eNodeB, a 5G base station or gNodeB, a Wi-Fi AP, a MulteFire AP and a network controller (e.g., according to Bluetooth, ZigBee or Z-Wave).

The RAN may be implemented according to the Global System for Mobile Communications (GSM), the Universal Mobile Telecommunications System (UMTS), Long Term Evolution (LTE) and/or New Radio (NR).

The technique may be implemented on a Physical Layer (PHY), a Medium Access Control (MAC) layer, a Radio Link Control (RLC) layer and/or a Radio Resource Control (RRC) layer of a protocol stack for the radio communication.

As to a further aspect, a computer program product is provided. The computer program product comprises program code portions for performing any one of the steps of the method aspect disclosed herein when the computer program product is executed by one or more computing devices. The computer program product may be stored on a computer-readable recording medium. The computer program product may also be provided for download via a data network, e.g., via the Internet and/or by the AP. Alternatively or in addition, the method may be encoded in a Field-Programmable Gate Array (FPGA) and/or an Application-Specific Integrated Circuit (ASIC), or the functionality may be provided for download by means of a hardware description language.

As to one device aspect, a device for transmitting data from a passive radio device is provided. The device may be configured to perform the one method aspect. Alternatively or in addition, the device may comprise an exposing unit configured to expose an antenna of the passive radio device to an incident radio signal. A frequency domain representation of the incident radio signal may comprise at least one muted gap between active subcarriers within a bandwidth of the incident radio signal. The device may further comprise a backscatter unit configured to backscatter the incident radio signal from the antenna by modulating an impedance of the antenna according to the data using at least two different modulation frequencies that differ by less than the bandwidth.

As to another device aspect, a device for receiving data from a passive radio device is provided. The device may be configured to perform the other method aspect. Alternatively or in addition, the device may comprise a receiving unit configured to receive a backscattered radio signal from an antenna of the passive radio device that is exposed to an incident radio signal. A frequency domain representation of the incident radio signal may comprise at least one muted gap between active subcarriers within a bandwidth of the incident radio signal. The backscattered radio signal may be frequency modulated according to the data using at least two different modulation frequencies that differ by less than the bandwidth.

As to a still further aspect, a device for transmitting data from a passive radio device is provided. The device comprises at least one processor and a memory. Said memory may comprise instructions executable by said at least one processor whereby the device is operative to expose an antenna of the passive radio device to an incident radio signal. A frequency domain representation of the incident radio signal may comprise at least one muted gap between active subcarriers within a bandwidth of the incident radio signal. Execution of the instructions may further cause the device to be operative to backscatter the incident radio signal from the antenna by modulating an impedance of the antenna according to the data using at least two different modulation frequencies that differ by less than the bandwidth.

As to a still further aspect, a device for receiving data from a passive radio device is provided. The device comprises at least one processor and a memory. Said memory may comprise instructions executable by said at least one processor whereby the device is operative to receive a backscattered radio signal from an antenna of the passive radio device that is exposed to an incident radio signal. A frequency domain representation of the incident radio signal may comprise at least one muted gap between active subcarriers within a bandwidth of the incident radio signal. The backscattered radio signal may be frequency modulated according to the data using at least two different modulation frequencies that differ by less than the bandwidth.

As to a still further device aspect, a device for transmitting data from a passive radio device is provided. The device may comprise one or more modules for performing the one method aspect. Alternatively or in addition, the device may comprise an antenna module for exposing an antenna of the passive radio device to an incident radio signal. A frequency domain representation of the incident radio signal may comprise at least one muted gap between active subcarriers within a bandwidth of the incident radio signal. The device may further comprise a backscatter module for backscattering the incident radio signal from the antenna by modulating an impedance of the antenna according to the data using at least two different modulation frequencies that differ by less than the bandwidth.

As to a still further device aspect, a device for receiving data from a passive radio device is provided. The device may comprise one or more modules for performing the other method aspect. Alternatively or in addition, the device may comprise a reception module for receiving a backscattered radio signal from an antenna of the passive radio device that is exposed to an incident radio signal. A frequency domain representation of the incident radio signal may comprise at least one muted gap between active subcarriers within a bandwidth of the incident radio signal. The backscattered radio signal may be frequency modulated according to the data using at least two different modulation frequencies that differ by less than the bandwidth.

As to a still further aspect, a user equipment (UE) configured to communicate with a base station is provided. The UE comprises a radio interface and processing circuitry configured to execute the any one of the steps of the one method aspect.

As to a still further aspect a communication system including a host computer is provided. The host computer may comprise a processing circuitry configured to provide user data. The host computer may further comprise a communication interface configured to forward user data to a cellular network for transmission to a user equipment (UE), wherein the UE comprises a radio interface and processing circuitry, the processing circuitry of the UE being configured to execute any one of the steps of the one method aspect.

The communication system may further include the UE. Alternatively or in addition, the cellular network may further include a base station configured to communicate with the UE.

The processing circuitry of the host computer may be configured to execute a host application, thereby providing the user data. Alternatively or in addition, the processing circuitry of the UE may be configured to execute a client application associated with the host application.

As to a still further aspect a method implemented in a user equipment (UE) is provided. The method may comprise any of the steps of the method aspect.

The devices, the UE, the AP (e.g., the base station), the system or any node or station for embodying the technique may further include any feature disclosed in the context of any one of the method aspects, and vice versa. Particularly, any one of the units and modules, or a dedicated unit or module, may be configured to perform or trigger one or more of the steps of any one of the method aspects.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a New Radio (NR) or 5G implementation, it is readily apparent that the technique described herein may also be implemented in any other radio network, including 3GPP LTE or a successor thereof, Wireless Local Area Network (WLAN) according to the standard family IEEE 802.11, Bluetooth according to the Bluetooth Special Interest Group (SIG), particularly Bluetooth Low Energy and Bluetooth broadcasting, Z-Wave, ZigBee based on IEEE 802.15.4 and/or Radio-Frequency Identification (RFID) according to the standard ISO/IEC 18000.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
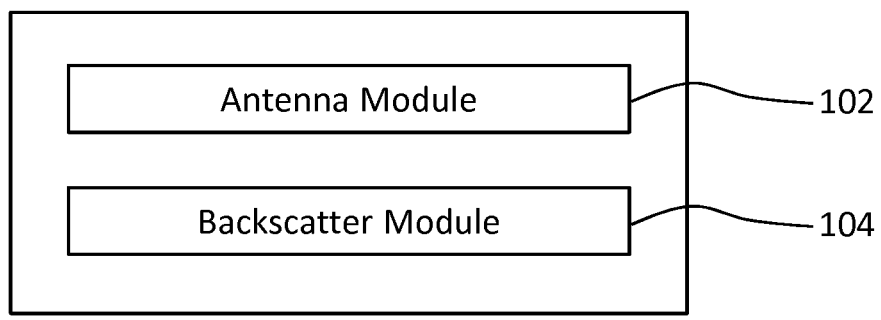
FIG. 1 shows a schematic block diagram of a device for transmitting data from a passive radio device.

FIG. 1 schematically illustrates a block diagram of a device for transmitting data from a passive radio device. The transmitting device is generically referred to by reference sign 100. The transmitting device 100 may briefly be referred to as the transmitter.

The transmitting device 100 comprises an antenna module 102 for exposing an antenna of the passive radio device to an incident radio signal (which may also be referred to as impinging radio signal). A frequency domain representation of the incident radio signal comprises at least one muted gap between active subcarriers within a bandwidth of the incident radio signal. The transmitting device 100 further comprises a backscatter module 104 that backscatters the incident radio signal from the antenna by modulating an impedance of the antenna according to the data using at least two different modulation frequencies that differ by less than the bandwidth. The backscatter module 104 may also be referred to as a modulation module.

Any of the modules of the device 100 may be implemented by units configured to provide the corresponding functionality.

The transmitting device 100 may comprise or may be embodied by the passive radio device. A radio device may be passive, if the energy in a radio signal transmitted from the passive radio device is induced by the incident radio signal. The transmission energy may be induced in the exposed antenna 102 and/or a modulation circuit coupled to the antenna for the modulation in the module 104 (also: modulation module).

Figure 2:
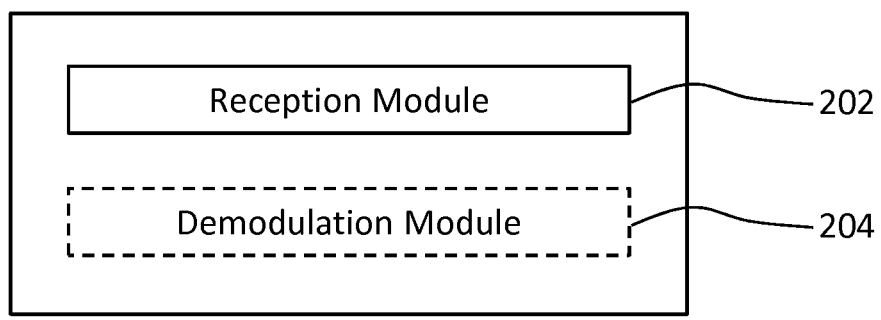
FIG. 2 shows a schematic block diagram of a device for receiving data from a passive radio device.

FIG. 2 schematically illustrates a block diagram of a device for receiving data from a passive radio device. The receiving device is generically referred to by reference sign 200. The receiving device 100 may briefly be referred to as the receiver.

The receiving device 200 comprises a reception module 202 that receives a backscattered radio signal from an antenna of the passive radio that is exposed to an incident radio signal. A frequency domain representation of the incident radio signal comprises at least one muted gap between active subcarriers within a bandwidth of the incident radio signal. The backscattered radio signal is frequency modulated according to the data using at least two different modulation frequencies that differ by less than the bandwidth.

Optionally, the receiving device 200 further comprises a demodulation module 204 that demodulates the received backscattered radio signal by determining the modulation frequency used for the frequency modulation. A sequence of the determined modulation frequencies may be representative of the data, e.g., after decoding and/or a cyclic redundancy check (CRC).

Any of the modules of the device 200 may be implemented by units configured to provide the corresponding functionality.

The device 200 may be embodied and/or the incident radio signal may be generated by an active radio device or a base station. A radio device may be active, if a radio signal transmitted and/or received by the active radio device is amplified by means of an electronic circuit of the active radio device.

Herein, any (e.g., active or passive) radio device may include a mobile or portable station or any device connectable to a radio access network (RAN). Any radio device may be a user equipment (UE), a device for machine-type communication (MTC) and/or a device for (e.g., narrowband) Internet of Things (IoT). Two or more of the radio devices (e.g., the passive radio device embodying the device 100 and an active radio device embodying the device 200) may be configured to wirelessly connect to each other, e.g., in an ad hoc radio network or via 3GPP sidelinks.

The base station may encompass a network controller (e.g., a Wi-Fi access point) or a radio access node (e.g. a 3G Node B, a 4G eNodeB or a 5G gNodeB) of the RAN. The base station may be configured to provide radio access.

Figure 3:
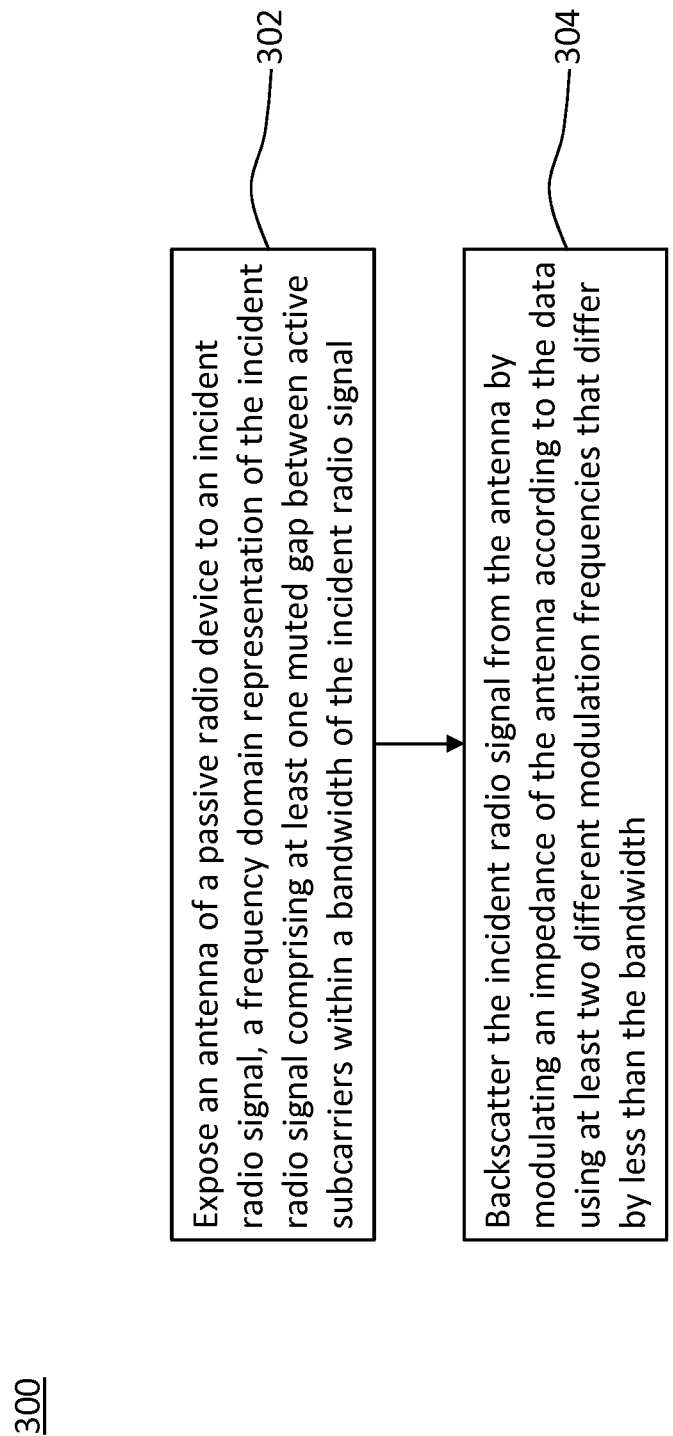
FIG. 3 shows a flowchart for a method of transmitting data from a passive radio device, which method is implementable by the device of FIG. 1.

FIG. 3 shows a flowchart for a method 300 of transmitting data from a passive radio device. The method 300 comprises or initiates a step 302 of exposing an antenna of the passive radio device to an incident radio signal. The exposing step 302 may be implemented by providing the antenna of the passive radio device. A frequency domain representation of the incident radio signal comprises at least one muted gap between active subcarriers within a bandwidth of the incident radio signal. The method 300 further comprises or initiates a step 304 of backscattering the incident radio signal from the antenna by modulating an impedance of the antenna according to the data using at least two different modulation frequencies that differ by less than the bandwidth. The backscattering step 304 may also be referred to as a modulating step.

The method 300 may be performed by the transmitting device 100, e.g., at or using the passive radio device for accessing the RAN or another radio device. For example, the modules 102 and 104 may perform the steps 302 and 304, respectively.

By modulating the impedance of the antenna 102, the backscattered radio signal may be emitted (e.g., transmitted coherently with the incident radio signal) from the antenna 102 of the passive radio device 100 in the backscattering step 304. The backscattered radio signal may comprise electromagnetic radiation resulting from a mixture (e.g., occurring in the modulation module 104) of a subcarrier frequency of each of the active subcarriers in the incident radio signal and the used modulation frequency.

Figure 4:
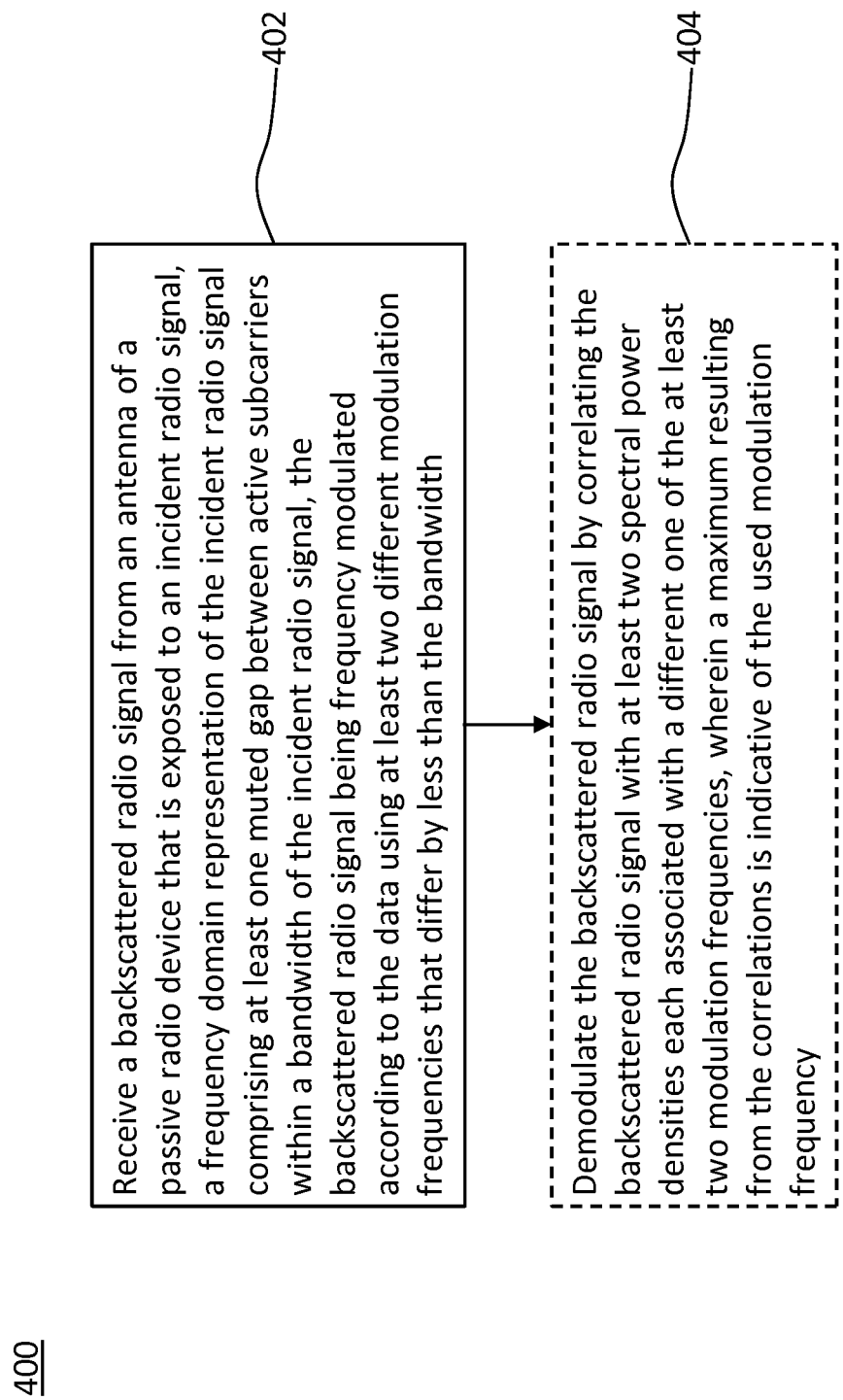
FIG. 4 shows a flowchart for a method of receiving data from a passive radio device, which method is implementable by the device of FIG. 2.

FIG. 4 shows a flowchart for a method 400 of receiving data from a passive radio device. In a step 402 of the method 400, a backscattered radio signal is received from an antenna of the passive radio device that is exposed to an incident radio signal. A frequency domain representation of the incident radio signal comprises at least one muted gap between active subcarriers within a bandwidth of the incident radio signal. The backscattered radio signal is frequency modulated according to the data using at least two different modulation frequencies that differ by less than the bandwidth. The backscattered radio signal may be frequency modulated in that the received backscattered radio signal comprises frequency-shifted components of the incident radio signal, which are shifted relative to the incident radio signal by the used modulation frequency.

In an optional step 404, the backscattered radio signal is demodulated by correlating the backscattered radio signal with at least two different power spectral densities each associated with a different one of the at least two different modulation frequencies. A maximum among the correlations may indicate the used modulation frequency. Each correlation may be implemented by computing a dot product or a convolution (e.g., in the frequency domain representation or in a time domain representation).

The method 400 may be performed by the receiving device 200, e.g., at or using an active radio device or a base station of the RAN. For example, the modules 202 and 204 may perform the steps 402 and 404, respectively.

Figure 5:
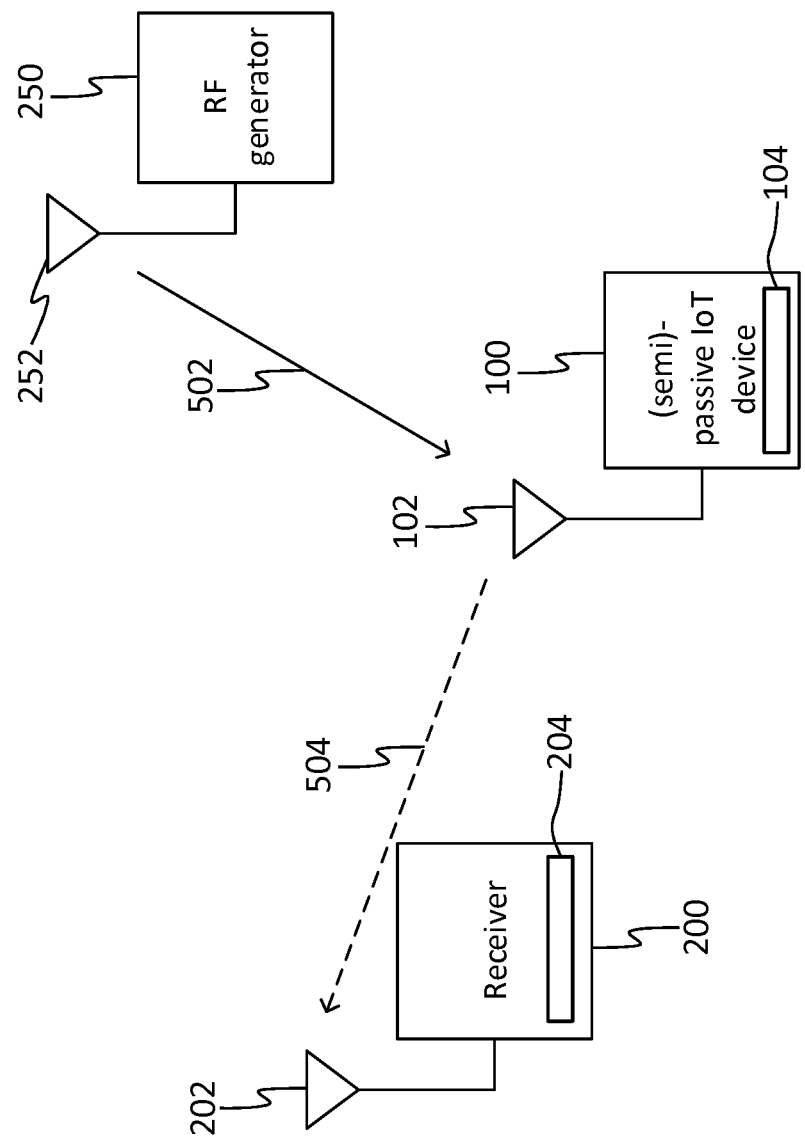
FIG. 5 schematically illustrates an exemplary environment for implementing the device of FIG. 1 and the device of FIG. 2.

FIG. 5 schematically illustrates an exemplary radio environment 500 for implementing the technique. The radio environment 500 comprises at least one of a generating device 250, one or more embodiments of the transmitting device 100 and one or more embodiments of the receiving device 200. The incident radio signal 502 is generated by the generating device 250. The incident radio signal 502 may also be referred to as a radio frequency (RF) carrier. The generating device 250 may be comprised in the receiving device 200, in which case a transmission module 252 (e.g., comprising a power amplifier and a transmit antenna) of the generating device 250 may be implemented in a transceiver module 202 (e.g., comprising a reception antenna and/or the reception module) of the receiving device 200.

The backscattered radio signal 504 is transmitted in the step 304 by the transmitting device 100. By way of example, the backscattered radio signal 504 may be modulated in the step 304 using only two possible positions in the frequency domain, i.e., using two different modulation frequencies. Preferably, the resulting modulation in the step 304 imparts a Manchester coding on the backscattered radio signal 504. For example, the backscattered radio signal 504 comprises at least one frequency components that is either active (i.e., comprises an image of an active subcarrier) or muted depending on which one of the two different modulation frequencies is used in the step 304. Such frequency components are also referred to as indicative frequency components.

The backscattered radio signal 504 may comprise a plurality of indicative frequency components, which can be received by the receiving device 200 for increasing the reliability or reducing the bit error rate of the data transmission. More specifically, the backscattered radio signal 504 may comprise at least two indicative frequency components that are complementary. That is, one of the two frequency components is active while the other is muted, and vice versa, depending on which one of the two different modulation frequencies is used in the step 304. The complementary frequency components can be used by the receiving device 200 to determine an energy threshold value for detecting the active and muted states of any frequency component. The energy threshold value may be based on the average of the energy received in the at least two complementary frequency components.

The radio environment 500 may comprise, or may be implemented without, a stationary network infrastructure such as base stations. The generating device 250 may comprise an Orthogonal Frequency-Division Multiplexing (OFDM) transmitter, e.g., a 3GPP base station, a 3GPP user equipment (UE), a MulteFire access point (AP), a Wi-Fi AP or a Wi-Fi mobile station. Optionally, the generating device 250 is configured for a beamforming transmission of the incident radio signal 502. Alternatively or in addition, the active subcarriers in the incident radio signal 502 may be phase modulated according to other data that is transmitted by the generating device 250. For example, the generating device 250 may transmit (e.g., broadcast) the other data to the receiving device 200 or to one or more radio devices other than the transmitting device 100.

The receiving device 200 may comprise an OFDM receiver, e.g., a 3GPP base station, a MulteFire AP, a 3GPP UE, a Wi-Fi AP or a Wi-Fi mobile station. The demodulation 404 of the backscattered radio signal 504 may be based on the modulation frequencies used for the modulation in the step 304, e.g., by detecting the frequency-shifted active subcarriers in the backscattered radio signal based on energy and/or irrespective of a phase of the active subcarriers in the backscattered radio signal.

The passive radio device 100 may be an IoT device. Alternatively or in addition, the passive radio device 100 may be semi-passive. Baseband signal processing or a user interface of the semi-passive radio 100 may be powered by a local power source, e.g., a battery, a solar cell, a power harvesting module or a combination thereof.

The passive radio device 100 may be distinguished from an active radio device in that the generation of the incident radio signal 502 is delegated to the generating device 250, e.g., an external node that is mains powered. Preferably, the passive radio device 100 comprises no power hungry modules such as power amplifiers, filters and/or mixers (i.e., up-converters).

Figure 6A:
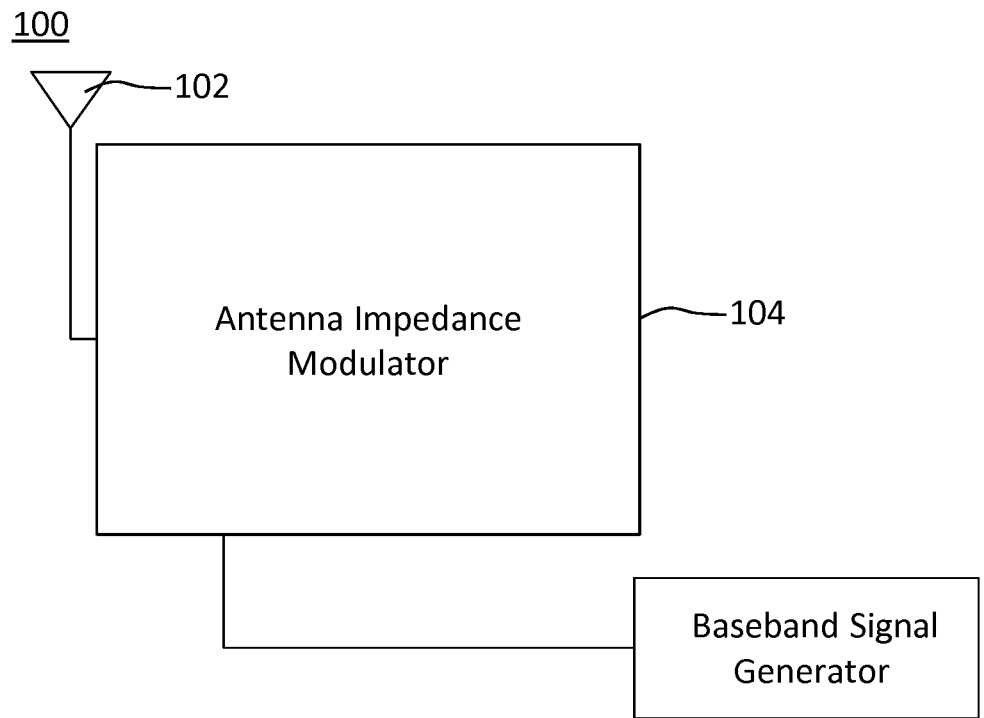
FIGS. 6A and 6B show schematic block diagrams for embodiments of the device of FIG. 1.

As schematically illustrated in FIG. 6A, the passive radio device 100 transmits the backscattered radio signal 504 in the step 304 from the antenna that is controllably mismatched to the incident radio signal 502, e.g., by means of an antenna impedance modulator in the modulation module 104. Hence, the incoming radio waves of the incident radio signal 502 are backscattered (also: reflected). By modulating the backscattered radio signal 504, the data is transmitted to the receiving device 200. The modulation module 104 may comprise at least one of a Pi circuit, T circuit and an LC filter, which is controlled for modulating the impedance of the antenna 102 according to a baseband signal representing the data.

Figure 6B:
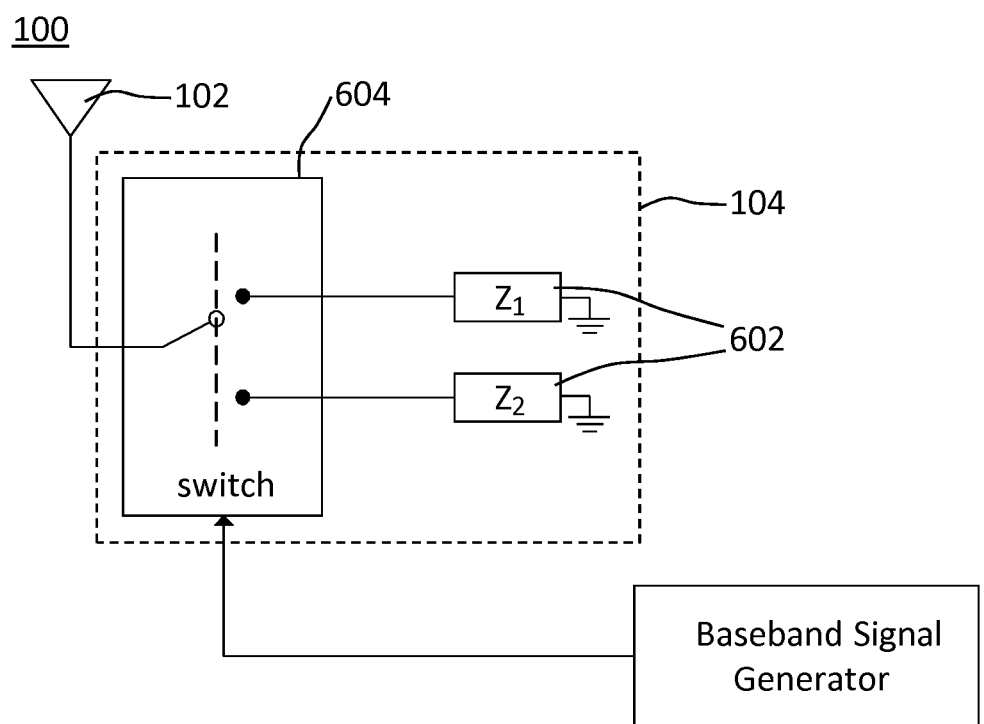

A basic embodiment of a transmission architecture for a semi-passive radio device 100 is schematically illustrated in FIG. 6B. The modulation module 104 is configured to alternatingly apply 2 different antenna impedances 602, labeled $Z_1$ and $Z_2$, by means of a switch 604. Each impedance imparts a different phase shift to the backscattered radio signal 504. By controlling the switch 604, it is possible to obtain any desired phase shifts, for example from a Binary Phase shift Keying (BPSK) constellation $$BPSK=\{0,\pi\} \text{ in terms of phase shift.}$$

The exemplary constellation is listed in below table.

| Antenna impedance | Phase shift imparted on backscattered radio signal 504 [rads] |
|---|---|
| $Z_1$ | 0 |
| $Z_2$ | $\pi$ |

The left column indicates the antenna impedance 602. The right column indicates the resulting phase shift between the incident radio signal 502 and the backscattered radio signal 504.

The switch 604 has, e.g., 2 states corresponding to 2 impedances 602. By changing the state of the switch 604 at a baud rate of a data stream (which may or may not include the data of the method 300), a center-frequency signal component in the backscattered radio signal 504 may be generated with zero frequency shift relative to the incident radio signal 502. The center-frequency signal component in the backscattered radio signal 504 carries the data stream. In the example, the center-frequency component is a BPSK signal. Optionally, the zero frequency shift is one of the at least two modulation frequencies.

More specifically, the switch 602 applies a sequence of antenna impedances $Z_i$ according to a sequence of phase modulation symbols $\varphi_i \in BPSK$, such that for each of the active subcarriers in the incident radio signal 502, e.g., according to $$\cos(2\pi f_c t) \text{ in a time domain representation}$$

with a subcarrier frequency $f_c$, there is an active subcarrier in the backscattered radio signal 504, e.g., according to $$\cos(2\pi f_c t + \varphi_k) \text{ in the time domain representation}$$

with the same subcarrier frequency $f_c$.

By operating the switch 604 at any non-zero modulation frequency, F, among the modulation frequencies, the active subcarriers in the incident radio signal 502 are frequency-shifted according to the corresponding non-zero modulation frequency F, e.g., according to $$\cos(2\pi(f_c+F)t+\tilde{\varphi}); \text{ and}$$

$$\cos(2\pi(f_c-F)t+\tilde{\varphi})$$

in a time domain representation with some phase $\tilde{\varphi}$. Optionally, the phase $\tilde{\varphi}$ is modulated to convey further information or a higher data rate to the receiver.

Furthermore, by operating the switch 604 according to a sequence of modulation frequencies $F_i$ corresponding to a sequence of frequency modulation symbols representing the data, the data is carried by the frequency-modulated backscattered radio signal 504. The sequence of modulation frequencies, $F_i$, each being one of the at least two different modulation frequencies, is provided by the baseband signal to the modulation module 104.

A transmitting device 100 with a two-state switch 604 and two impedances 602 is capable of generating BPSK or On-Off-Keying (OOK). The technique has been described using such keying in the modulation module 104 for clarity and not limitation. The modulation module 104 may be modified or extended, e.g., by using any other keying or constellation such as more general phase and/or amplitude modulations, including Quadrature Amplitude Modulation (QAM). More general, M impedances 602 may be applicable in the modulation module 104 to generate M constellation symbols, e.g., for M-ary QAM. The modulation module 104 may comprise any of the features described by S. J. Thomas et al. in "Quadrature Amplitude Modulated Backscatter in Passive and Semipassive UHF RFID Systems", IEEE Transactions on Microwave Theory and Techniques, Vol. 60, No. 4, pp. 1175-1182.

Alternatively or in combination, while the changing of the impedance of the antenna 102 has been described by means of a switch 604, the impedance may be modulated continuously. That is, the modulation frequency may correspond to an impedance modulation rate instead of an impedance switching rate in a variant of any embodiment of the device 100.

A subcarrier bandwidth of each of the active subcarriers in the backscattered radio signal 504 corresponds, e.g., approximately, to the baud rate (i.e., the symbol rate) or the inverse of the symbol duration. The used modulation frequency is the rate at which switching 604 of the impedances 602 occurs and corresponds to the frequency shift of the backscattered radio signal 504 relative to the incident radio signal 502. The baseband signal modulates the state of the impedance switch 604 at the used modulation frequency. That is, for frequency modulation, the modulation frequency changes at the baud rate.

Optionally, when using the modulation frequency $F_1$ equal to zero, the switching rate may be equal to the baud rate. In other words, while using the modulation frequency $F_1=0$ for the modulation in the modulation module 104, the baseband signal generator generates a baseband signal allowing it to change up to once for each transmitted data symbol. The center of frequency of the backscattered radio signal 504 coincides with the center of frequency of the incident radio signal 502.

At least one modulation frequency, say $F_2$, of the at least two modulation frequencies is greater than the baud rate. That is, when using the modulation frequency $F_2$ in the backscattering step 304, the impedance switching rate is greater than the baud rate.

For example, the baseband signal generator generates a baseband signal that has the pre-determined frequency $F_2$.

When this baseband signal modulates the state of the switch 604, the resulting effect is a mixing of the frequency of each of the active subcarriers in the incident radio signal 502 with the baseband frequency $F_2$. This yields the backscattering of two images of the incident radio signal 502 in the frequency domain representation of the backscattered radio signal 504. The images are frequency-shifted by $-F_2$ and $+F_2$ relative to the incident radio signal 502. That is, each of the active subcarriers at respective frequencies $f_c$ in the incident radio signal 502 corresponds to two active subcarriers at frequencies $f_c \pm F_2$ in the backscattered radio signal. The modulation frequency (or frequency shift) $F_2$ corresponds to two images $\pm F_2$ shifted by opposite signs relative to the frequency $f_c$ of the active subcarriers in the incident radio signal 502.

Passive and semi-passive radio devices 100 have beneficial IoT applications, due to their power efficiency. The transmitting device 100 may be implemented as a power-efficient semi-passive station (STA), e.g., compliant with the standard IEEE 802.11b according to B. Kellogg et al., "Passive Wi-Fi: Bringing Low Power to Wi-Fi Transmissions", 13th USENIX Symposium on Networked Systems Design and Implementation, USENIX Association implement. Alternatively or in addition, the transmitting device 100 may be embodied by a modified passive RFID tag so that the backscattered radio signal 504 is receivable by an embodiment of the receiving device 200 based on an existing BLE receivers, e.g., according to J. F. Ensworth et al., "Every smart phone is a backscatter reader: Modulated backscatter compatibility with Bluetooth 4.0 Low Energy (BLE) devices", 2015 IEEE International Conference on RFID.

A transmit power of the generating device 250 (also: RF generator) may be limited by regulations targeting short range devices, particularly in unlicensed frequency bands. For example, the transmit power may be limited to an equivalent isotropically radiated power (EIRP) of 30 dBm or less, depending on the region. In addition, there may be limitations for a minimum signal bandwidth and/or limitations on the power spectral density. For example, regulations of the European Telecommunications Standards Institute (ETSI) limit the output power to 10 dBm/MHz in the 2.4 GHz band. It is desirable to re-use existing network nodes, such as access points, as RF generators, instead of relying on specific purpose nodes for RF generation. However, since these network nodes are communications devices, the regulations may severely limit the output power when used as pure tone generators, i.e., for an isolated active subcarrier, or more generally, of narrowband RF generators.

In embodiments of the technique, the bandwidth of the incident radio signal 502 (and consequently a bandwidth of the backscattered radio signal 504) can be sufficiently wide for reliably transmitting the data over a given distance without violating limits on the power spectral density by increasing the number of active subcarriers and muted gaps in between.

Any embodiment of devices 100, 200 and/or 250 may be compatible with a broadband radio communication protocol, e.g., Wi-Fi according to the standard IEEE 802.11, LTE or NR according to 3GPP or LTE according to the MulteFire alliance. Particularly, the generating device (also: tone generator) may be a Wi-Fi AP or a MulteFire AP.

Figure 7:
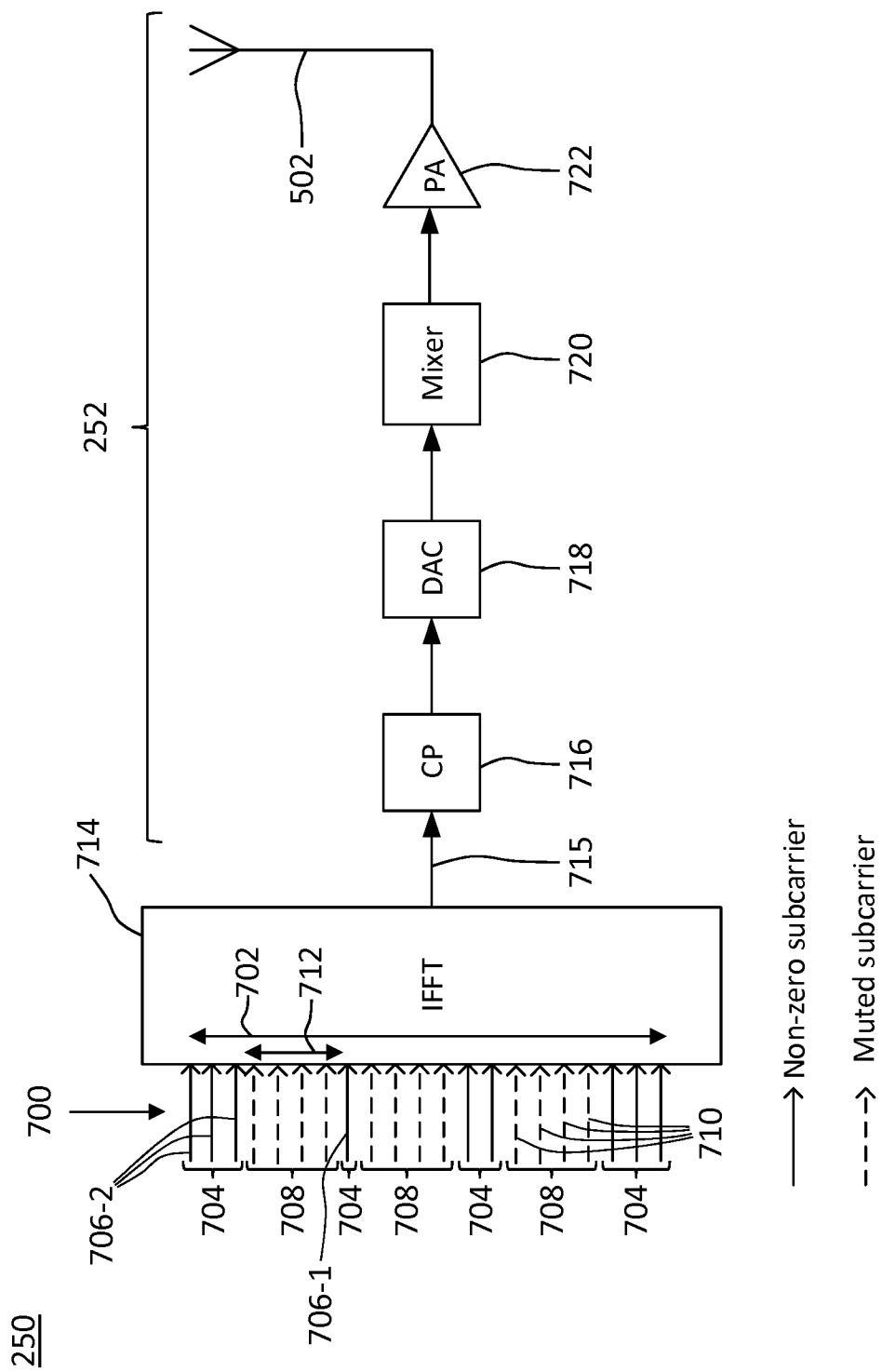
FIG. 7 shows a schematic block diagram for an embodiment of a generating device usable in conjunction with the devices of FIGS. 1 and 2.

FIG. 7 shows a schematic block diagram of an embodiment of the generating device 250 (also: RF generator or tone generator) that generates the incident radio signal 502. An example of a distributed subcarrier allocation for the incident radio signal 502 is also schematically illustrated.

The active subcarriers of the incident radio signal 502 are arranged according to a subcarrier frequency raster with uniform subcarrier spacing. For example, an OFDM signal 715 is generated by means of an inverse Fourier transformation 714 (e.g., an inverse Fast Fourier Transformation, IFFT). That is, a plurality of subcarriers 700 is arranged on the subcarrier frequency raster with uniform subcarrier spacing.

Within the bandwidth 702 of the incident radio signal 502 (and the corresponding OFDM signal 715 in the baseband), the incident radio signal 502 comprises at least two sets 704 of active subcarriers 706. The active subcarriers 706 defining any one of the sets 704 may be isolated active subcarrier 706-1 or a group of adjacent active subcarriers 706-2. At least one muted gap 708 is between the sets 704. According to the subcarrier frequency raster, each of the muted gaps 708 may comprise one muted subcarrier 710 or multiple adjacent muted subcarriers 710.

A gap bandwidth 712 of each of the muted gaps 708 may be equal for all muted gaps 708 within the bandwidth 702 of the incident radio signal 502 (and the corresponding OFDM signal 715 in the baseband). The number of muted subcarriers 710 per muted gap 708 may correspond to the gap bandwidth (e.g., in units of the subcarrier spacing). The number of muted subcarriers 710 per muted gap 708 may correspond to a (e.g., maximum) number of indicative subcarriers (i.e., indicative frequency components on the subcarrier frequency raster). Alternatively or in addition, the number of muted subcarriers 710 per muted gap 708 may correspond a (e.g., maximum) number of different modulation frequencies in an out-of-band implementation. The number of muted subcarriers 710 per muted gap 708 may correspond twice the (e.g., maximum) number of different modulation frequencies in an in-band implementation.

Half, about half or (e.g., as in the embodiment of FIG. 7) less than half of the subcarriers 700 are muted subcarriers 710. In any embodiment, the active subcarriers may be arranged in an interleaved or distributed pattern (e.g., a comb pattern) in the frequency domain representation, i.e., with the at least one muted gap 708 between at least some of the active subcarriers 706. This type of signal can be made compliant with the spectrum density regulations and may allow the generating device 250 to transmit with the highest possible output power. Particularly, this strategy may be used to fulfil spectrum density regulations and to increase or maximize the transmit power.

The baseband signal 715 is processed, e.g., by appending a cyclic prefix at reference sign 716 in the time domain. A digital-to-analog converter 718 converts the processed baseband signal to the analog domain. A mixer 720 up-converts the analog baseband signal to a carrier frequency of the incident radio signal 502, which is amplified by a power amplifier (PA) 722 for transmission.

The transmitting device 100 is configured for tone position keying, i.e., a coherent frequency modulation, of the incident radio signal 502 in the step 304. The backscattering module 104 (also: modulation module) modulates the position, in the frequency domain, of the backscattered active subcarriers 706 relative to the incident radio signal 502, i.e., the tones in the broadband signal of the generating device 250.

The technique may be implemented for at least one of in-band backscattering and out-of-band backscattering. First embodiments for out-of-band backscattering are described.

The first embodiment of the generating device 250 in FIG. 7 may be deployed for the out-of-band backscattering. The generating device 250 illuminates the transmitting device 100 with a broadband OFDM signal using a distributed allocation of the active subcarrier 706. More specifically, for some positive integer M, the subcarrier mapping inserts a muted gap 708 of M (or at least M) zero IFFT inputs between any set of at most M (or less than M) adjacent active (i.e., non-zero) IFFT inputs. These IFFT inputs generate a distributed subcarrier allocation, e.g., as shown in FIG. 7, and a corresponding incident radio signal 502.

In the example shown in FIG. 7, the gap bandwidth is M=4 (in units of the uniform subcarrier spacing). The dashed arrows represent the muted (or null) subcarriers 710. The solid lines represent the active (or non-null) subcarriers 706. Between any pair of neighboring sets 704 of active subcarriers 706, each having 1, 2 or 3 active subcarriers each, there are M=4 muted (or null) subcarriers 710.

Figure 8:
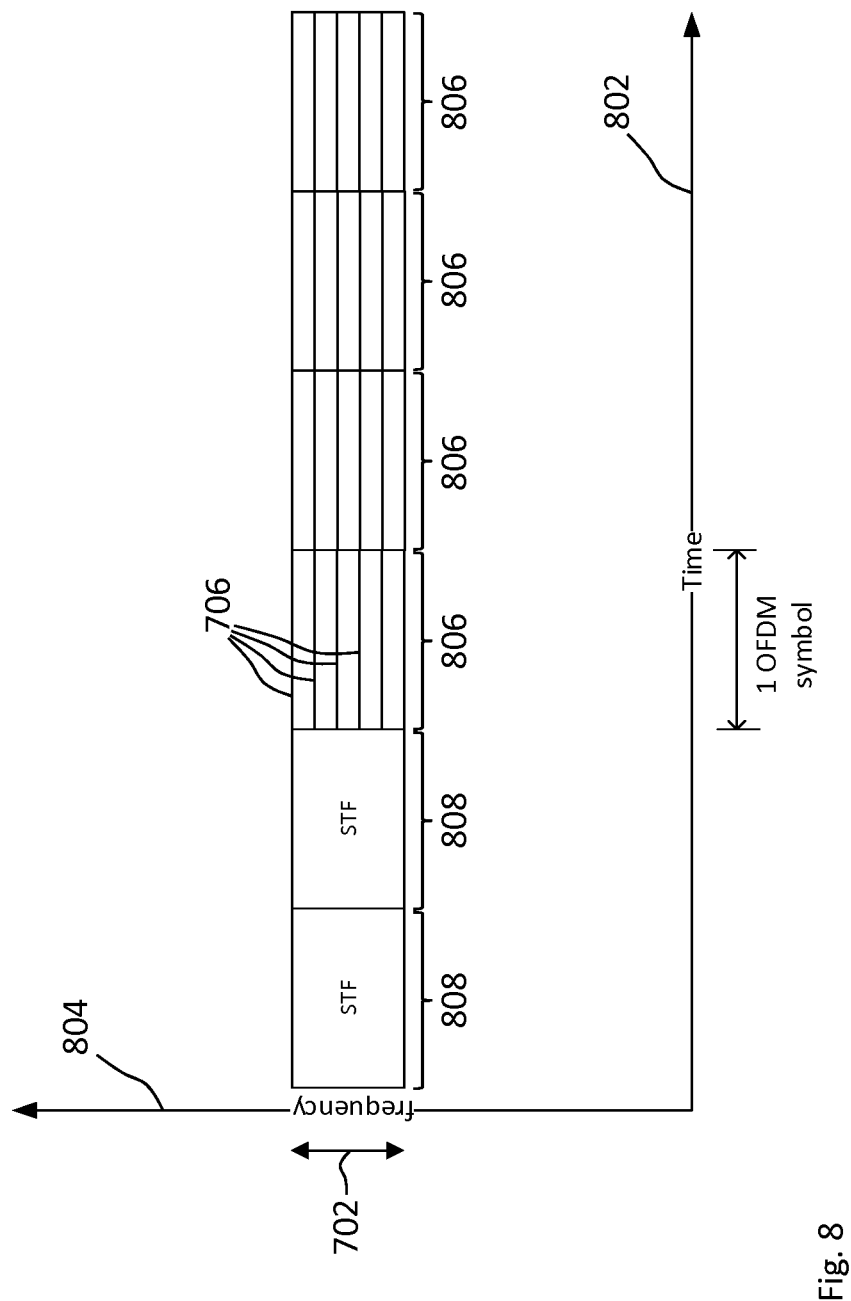
FIG. 8 schematically illustrates an example of an incident radio signal in time and frequency.

FIG. 8 schematically illustrates an (up-converted) OFDM signal in time 802 and frequency 804, which is transmitted by the generating device 250 as the incident radio signal 502. The horizontal lines inside each OFDM symbol 806 represent the active subcarriers 706 in the respective symbol 806.

The incident radio signal 502 starts with one or more training symbols 808, in order to aid the receiving device 200 to perform frequency synchronization. For example the signal 502 may start with one or more Short Training Fields (STF) according to IEEE 802.11 for timing and frequency synchronization.

A first embodiment of the transmitting device 100 performs the modulation, i.e., the tone position keying, based on the incident radio signal 502 comprising a plurality of active subcarriers (i.e., a plurality of tones). Accordingly, the transmitting device 100 backscatters in the step 304 not only single tones.

Figure 9:
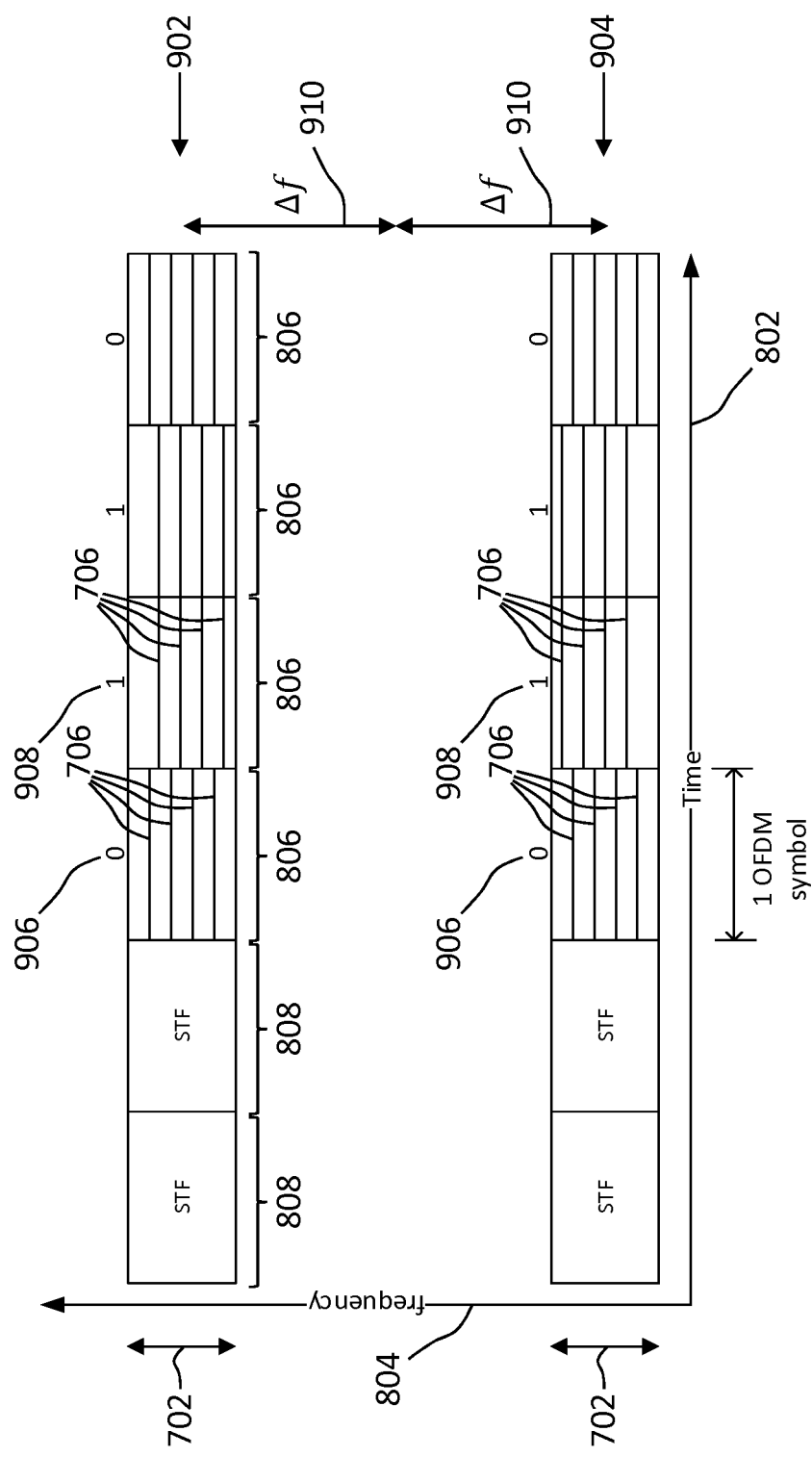
FIG. 9 schematically illustrates an example of a backscattered radio signal in time and frequency.

The backscattering radio signal 504 resulting from the modulation in the step 304 is schematically illustrated in FIG. 9. More specifically, the images 902 and 904 of the incident radio signal 502 (e.g., the example shown in FIG. 8) are modulated according to a sequence of data symbols 906 and 908 representing logical 0's and 1's, respectively. For conciseness and clarity, subcarriers and their respective images are indicated by like reference signs.

The transmitting device 100 keys a data symbol 906 for a logical 0 or a data symbol 908 for a logical 1 by frequency-shifting all active subcarriers 706 originating from the incident radio signal 502 according to the respective modulation frequency. The backscattered radio signal 504 comprises the backscattered and frequency-shifted active subcarriers 706. The horizontal lines in FIG. 9 inside each OFDM symbol 806 represent the backscattered active subcarriers 706. That is, the logical zero or the logical one are keyed by the position of the backscattered active subcarriers 706 inside each OFDM symbol 806.

The backscattered active subcarriers 706 are clustered in an upper sideband 902 and a lower sideband 904. Each of the sidebands 902 and 904 has the bandwidth 702 of the incident radio signal 502 and is outside of the bandwidth 702 occupied by the incident radio signal 502.

Denoting by $\Delta F$ the subcarrier spacing of the incident radio signal 502, the different modulation frequencies (i.e., relative frequency shifts plus a common offset 910 denoted by $\Delta f$) are used in the step 304 according to different (e.g., integer) multiples, e.g., $k_0$ and $k_1$ for two different modulation frequencies. A first modulation frequency (i.e., a first shift by) $k_0 \Delta F + \Delta f$ is used to key a logical 0; and a second modulation frequency (i.e., a second shift) by $k_1 \Delta F + \Delta f$ is used to key a logical 1. In the example shown in FIG. 9, $k_0 = 0$.

The keying is performed at the OFDM symbol rate, i.e., the baud rate is the OFDM symbol rate. In other words, one logical 0 or 1 is keyed during a period corresponding to the duration of one OFDM symbol 806. The baseband generator in the transmitting device 100 generates a baseband signal with frequency $$F_n = k_n \Delta F + \Delta f, n \in \{0,1\}.$$

The offset 910 denoted by $\Delta f$ is greater than the bandwidth 702 of the OFDM signal for out-of-band backscattering to ensure that the backscattered radio signal 504 and the incident radio signal 502 do not overlap in the frequency domain.

Figure 10:
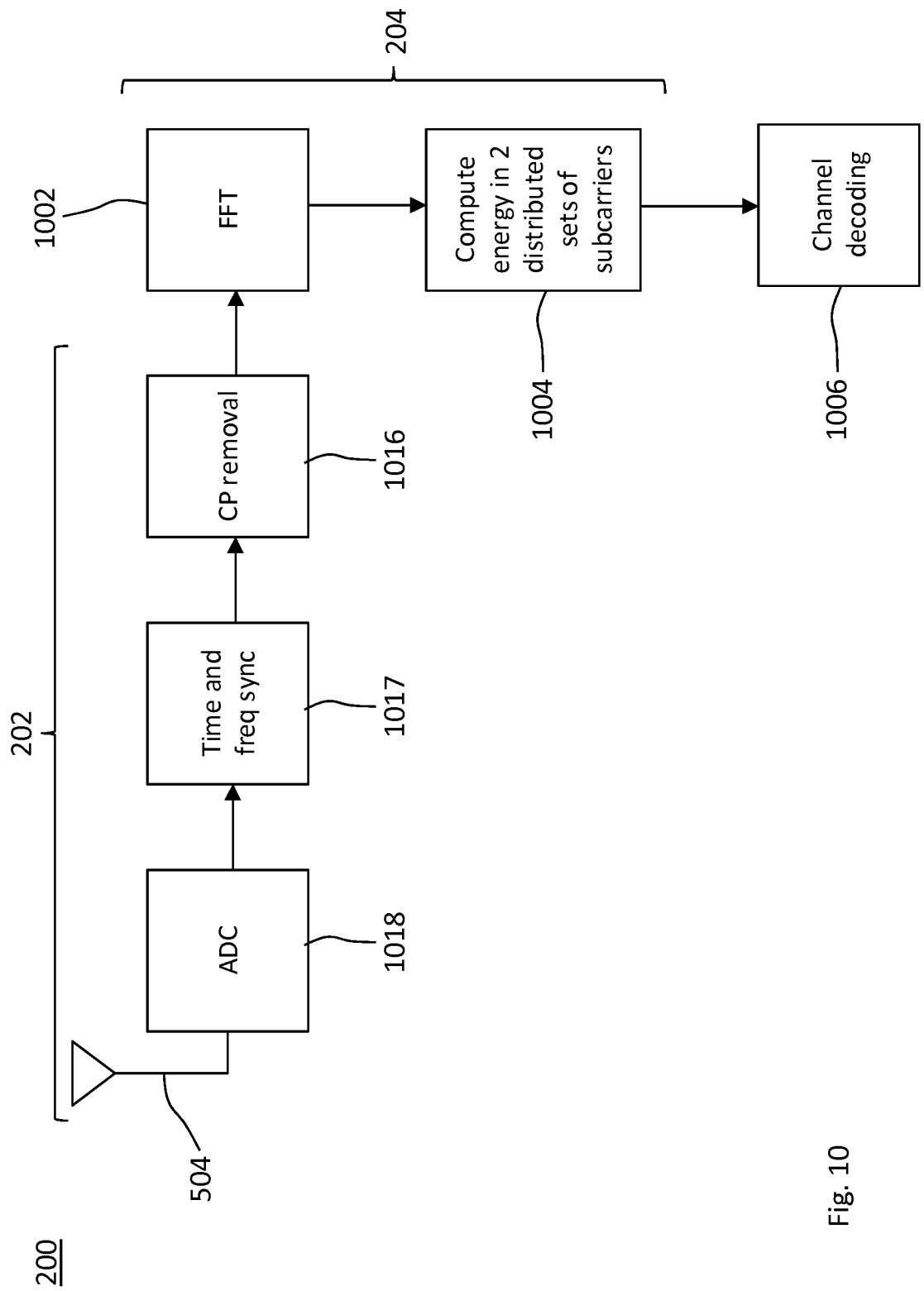
FIG. 10 shows a schematic block diagram for an embodiment of the device of FIG. 2.

FIG. 10 shows a schematic block diagram for a first embodiment of the receiving device 200. The receiving device 200 may comprise an analog-to-digital converter 1018, a synchronization module 1016 for synchronization with the OFDM symbol rate and/or the carrier frequency of the backscattered radio signal 504, e.g., based on the training symbols 808, and a module 1016 for removing the cyclic prefix. More specifically, the receiving device 200 synchronizes to the center of frequency of the backscattered radio signal 504, e.g., using the synchronization field 808 included by the generating device 250 at the beginning of the incident radio signal 502. The receiving device 200 removes the cyclic prefix, if present.

The embodiment of the receiving device 200 utilizes a Fourier transformation 1002 (e.g., a Fast Fourier Transformation, FFT) and an energy detector 1004 to demodulate the received backscattered radio signal 504 in the step 404. The receiving device 200 computes the FFT of the received backscattered radio signal 504. The energy detector 1004 estimates the position of the active subcarriers 706 (i.e., the frequency-shifted tones), e.g. by determining whether energy is received at one or more indicative subcarriers and/or by comparing the FFT of the received backscattered radio signal 504 with power spectral densities corresponding to the different modulation frequencies. The energy detector 1004 outputs soft bits and/or hard bits resulting from the estimation (e.g., the determination or the comparison).

By way of example, the transmission of a logical 0 or a logical 1 by the transmitting device 100 corresponds to two hypotheses on the distributed sets of active subcarriers 706. Let $E_0$ be the accumulated energy (or power, e.g., an average value for the power) in the active subcarriers 706 under the hypothesis that a logical 0 was transmitted, and let $E_1$ be the accumulated energy in the active subcarriers, under the hypothesis that a logical 1 was transmitted. The energy may be accumulated by summing up the energy in the FFT of the received backscattered radio signal 504 at those subcarriers that correspond to the shifted set of active subcarriers according to the hypothesis. If $E_0 > E_1$, a logical zero is detected. Otherwise, a logical one is detected. Optionally, a soft bit is calculated based on the difference $E_0 - E_1$.

Based on the hard bits or soft bits output by the demodulation module 204, a channel decoder 1006 decodes the data.

The receiving device 200 may be implemented in a Wi-Fi station (e.g., an AP) or a MulteFire node (e.g., an AP).

Figure 11:
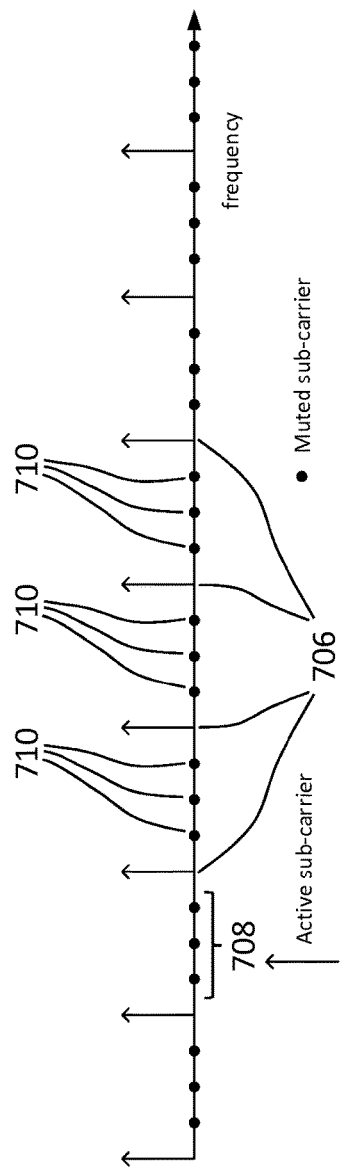
FIG. 11 schematically illustrates an example of a symbol of the incident radio signal in frequency.

An example of the out-of-band backscattering transmission is described in more detail. The example of the incident radio signal 502 schematically illustrated in FIG. 11 is an OFDM signal with a distributed subcarrier allocation, wherein every fourth subcarrier is active, i.e., M=3. The muted gaps 708 comprise M=3 adjacent muted subcarriers 710. The each set comprises exactly one isolated active subcarrier 706.

Figure 12:
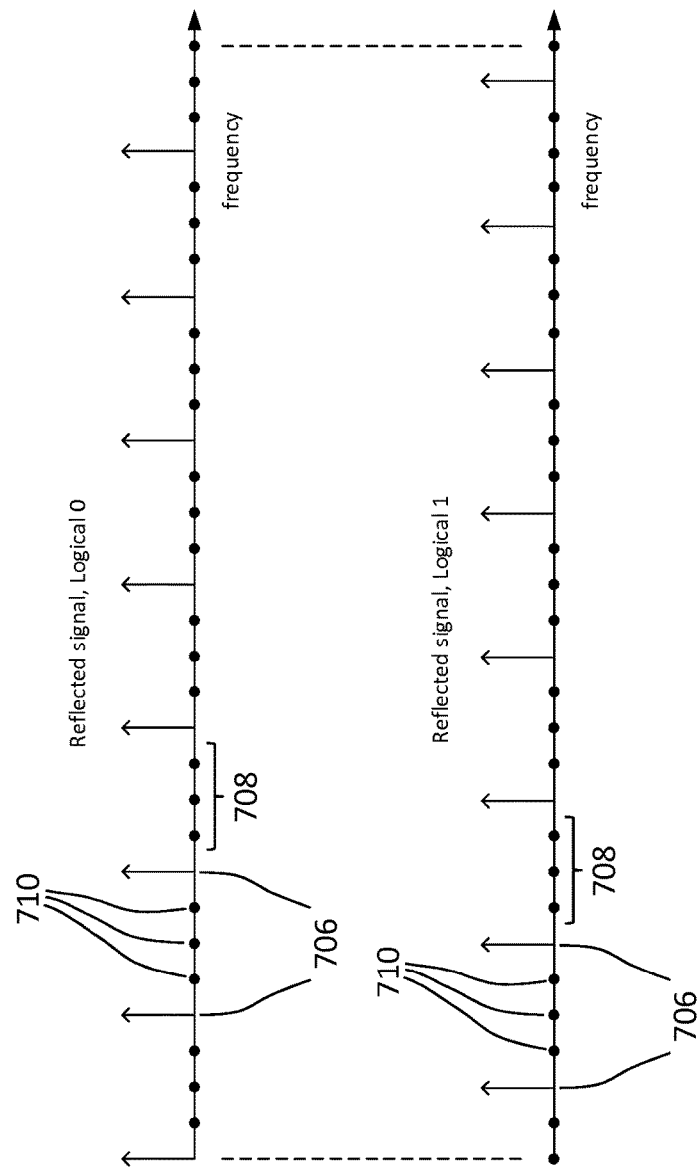
FIG. 12 schematically illustrates examples of symbols of the backscattered radio signal in frequency.

FIG. 12 schematically illustrates the backscattered radio signals 504. The subcarrier spacing is ΔF. A logical 0 is keyed by backscattering (also: reflecting) one OFDM symbol 806 in the incident radio signal 502 and shifting it in frequency by Δf, so $k_0=0$. This is illustrated in the upper half of FIG. 12. A logical 1 is keyed by reflecting one OFDM symbol in the incident radio signal 502 and shifting it in frequency by 2ΔF+Δf, so $k_1=2$. This is illustrated in the lower half of FIG. 12.

Figure 13:
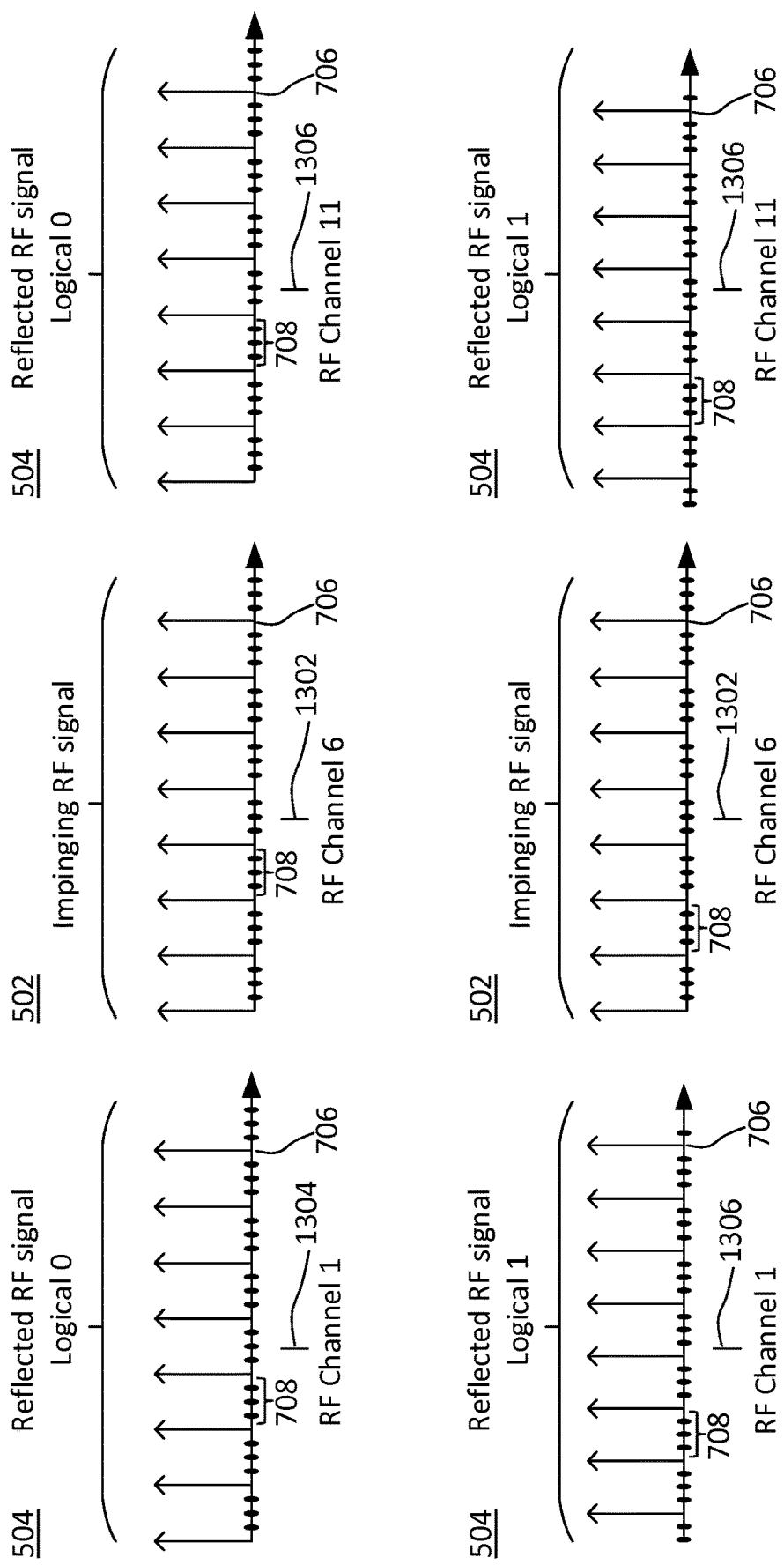
FIG. 13 schematically illustrates examples of symbols of the incident and backscattered radio signals in frequency.

FIG. 13 schematically illustrates the frequency domain representation for examples of the incident radio signal 502 (in the center column) and the backscattered radio signals 504 (on the left-hand and right-hand sides) representative of logical 0 (in the upper half) and 1 (in the lower half). By way of example, the center of frequency 1302 of the generating device 250 may be the RF channel 6 in the 2.4 GHz band. For an offset Δf=25 MHz, the backscattered radio signal 504 has images in the RF channels 1 and 11 at center frequencies 1304 and 1306, respectively.

Embodiments of the technique can be robust to interference. For example, the decision metric $E_0-E_1$ is not affected as long as both $E_0$ and $E_1$ are changed by the same amount. A mild degradation of receiver performance (e.g., the bit error rate at the receiving device 200) is expected when the energy of an interference is split roughly evenly among the active subcarriers 706 corresponding to a logical 1 and the active subcarriers 706 corresponding to a logical 0.

For example, referring to FIG. 13, suppose that the RF channel 6 (carrying the incident radio signal 502) is interfered by a Wi-Fi signal which is subject to flat fading and that the number of active subcarriers 706 allocated to logical 1 is equal to the number of active subcarriers 706 allocated to a logical 0. The latter condition may be fulfilled in many embodiments, because the frequency shifts brought about by the modulation frequencies do not change the number of active subcarriers. Then, the degradation in performance is expected to be mild. Thus, the technique can be used to ensure that the average signal power carries no information, making it robust to interference. Manchester coding is a well-known technique used to ensure that the average signal power carries no information, and hence makes the signal robust against fluctuations of the received average power. The technique disclosed herein can yield robustness without the need for a Manchester encoder.

Alternatively or in addition, if there is interference in the RF channel 11, the receiving device 200 may determine the presence of interference in the RF channel 11 and demodulate the received signal based on the RF channel 1 in the step 404, or vice versa.

Second embodiments for in-band backscattering are described. Any feature described in the afore-mentioned embodiments may be used for the second embodiments, e.g., by setting the offset Δf=0.

The second embodiment differs from the first embodiments in that the reflected signal occupies the same radio channel as the illuminating RF signal. The second embodiments for the generating device 250, the backscattering device 100 and the receiving device 200 may be similar to the respective first embodiments, the difference being that the offset 910 is smaller than the bandwidth 702 of the incident radio signal 502, e.g., the baseband signal has zero offset 910, Δf=0.

Figure 14:
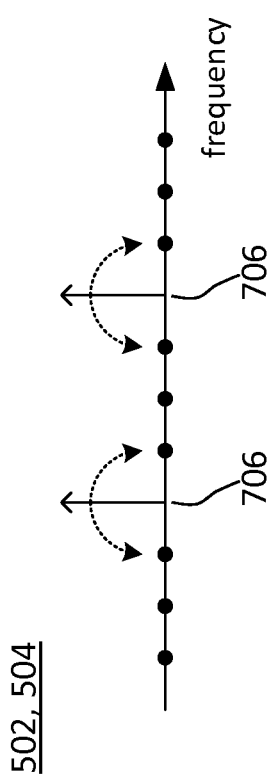
FIG. 14 schematically illustrates backscattered images of active subcarriers in frequency.

Moreover, a baseband signal with frequency $$F=k\Delta F$$

results in each active subcarrier 706 in the incident radio signal 502 generating two images at the subcarrier frequencies ±kΔF in the backscattered radio signal 504. This schematically illustrated in FIG. 14 for with k=1. Thus, a baseband signal with modulation frequency F being less than the bandwidth 702 generates two images of each active subcarrier at the positions indicated by the dotted arrows within the bandwidth 702.

Figure 15:
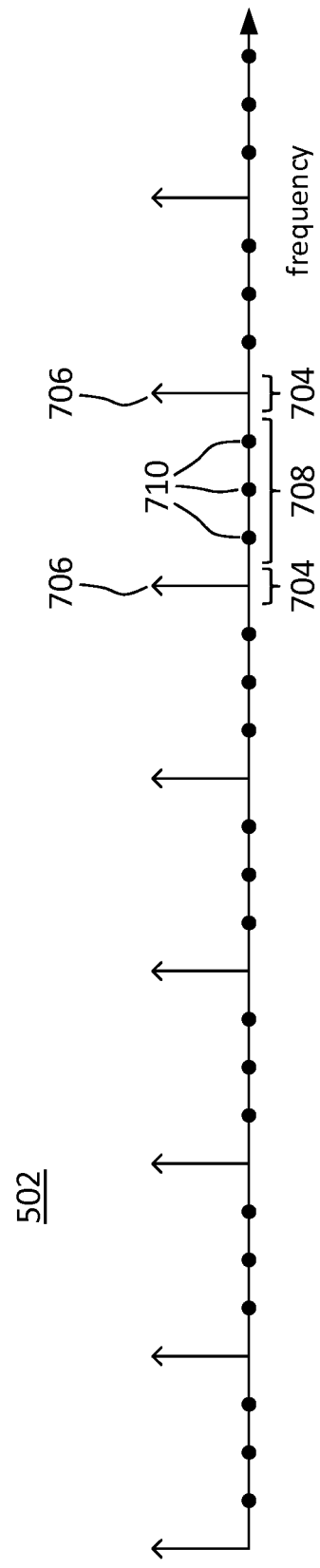
FIG. 15 schematically illustrates an example for a symbol of the incident radio signal in frequency for in-band scattering.

The distributed pattern of active subcarriers 706 in the incident radio signal 502 and the at least two different modulation frequencies are preferably defined to avoid interference among the images of the active subcarriers. This may be accomplished, for example, by ensuring that number of M muted subcarriers 710 between any neighboring pair of sets 704 of (isolated or adjacent) active subcarriers 706 is large enough to accommodate non-overlapping images. In other words, the active subcarriers 706 in the backscattered radio signal 504 corresponding to different images do not coincide. FIG. 15 shows an example of a distributed subcarrier allocation leaving M=3 muted subcarriers (i.e., the gap bandwidth in terms of the subcarrier spacing) between any neighboring pair of sets 704 of active subcarriers 706 (which are isolated active subcarriers 706 in the example of FIG. 15).

Figure 16:
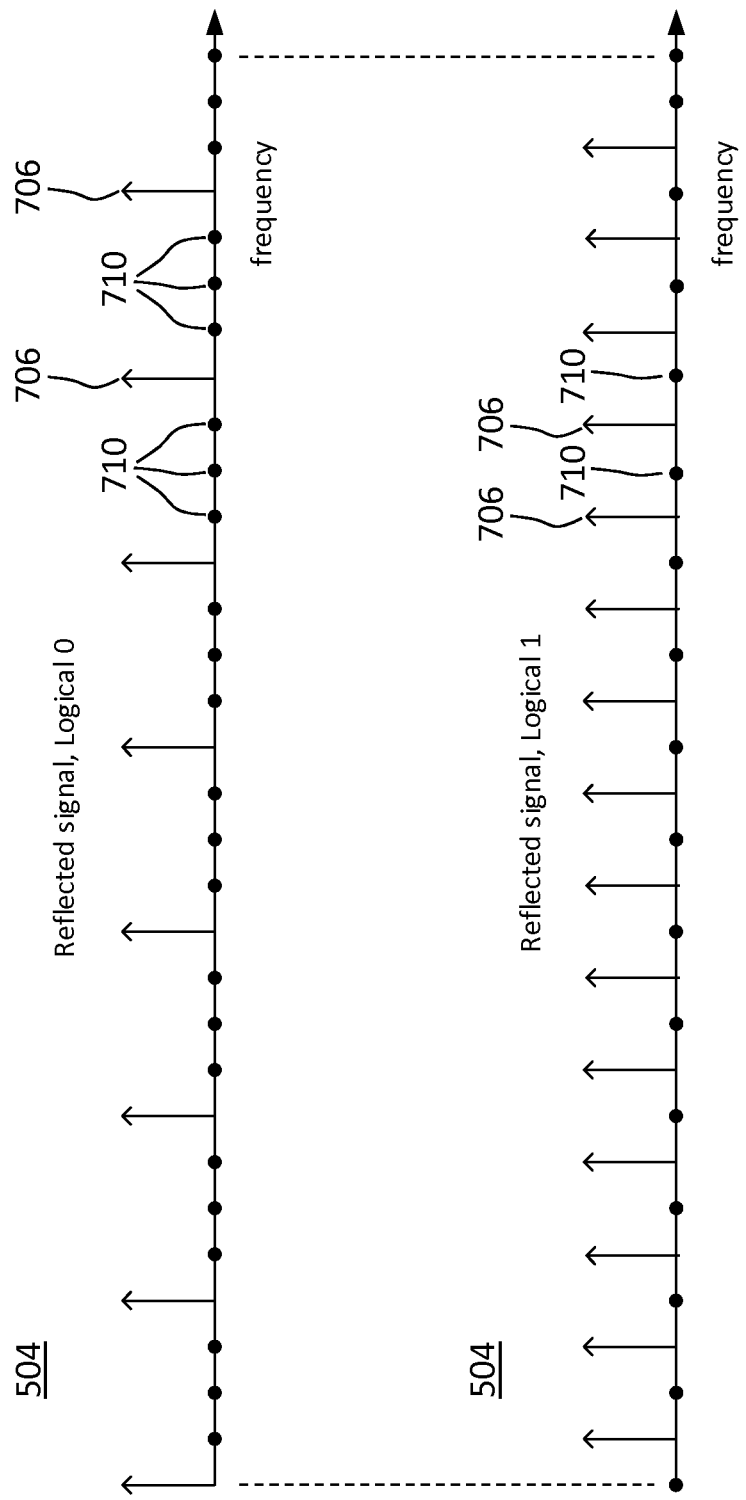
FIG. 16 schematically illustrates examples for symbols of the backscattered radio signal in frequency for in-band scattering.

A modulation 304 without frequency shift, i.e. F=0 (i.e., k=0 for a pure or elastic reflection, optionally with controlled phase shift), is used to key a logical 0, as is schematically illustrated in the upper half of FIG. 16. A logical 1 is keyed by applying a frequency shift F=ΔF (i.e., k=1). This is illustrated in the lower half of FIG. 16.

Since the active subcarriers 706 of the incident radio signal 502 are shifted by ±ΔF in the backscattered radio signal 504 and the gap bandwidth (i.e., the frequency-spacing between the isolated active subcarriers in the incident radio signal 502) is 3ΔF, there is no collision and no interference is caused in the backscattered radio signal 504.

Any of the embodiments, particularly those for out-of-band and in-band scattering, may exclusively or additionally comprise any one of the following features.

At the generating device 250, a multicarrier signal is transmitted as the incident radio signal 502. In the incident radio signal 502, the active subcarriers 706 are arranged in a comb structure or an interleaved pattern. For example, roughly half of the subcarriers are muted. At the transmitting device 100, the incident radio signal 502 from the generating device 250 interacts with the antenna. A first frequency shift is applied for the backscattered radio signal 504 keying a logical 0. A second frequency shift is applied for the backscattered radio signal 504 keying a logical 1. At the receiving device 200, the backscattered radio signal 504 is received. A discrete Fourier transformation (DFT) is performed on the received baseband signal. The active subcarriers corresponding to a logical 0 and the active subcarriers corresponding to a logical 1 are determined. A soft bit or a hard bit is computed based on the energy $E_0$ accumulated over the subcarriers corresponding to a logical 0 and the energy $E_1$ accumulated over the subcarriers corresponding to a logical 1.

The modulation frequencies at the transmitting device 100 may be large enough such that the backscattered images occupy different RF channels. That is, each image is outside of the RF channel occupied by the incident radio signal. Alternatively, the at least two different modulation frequencies at the transmitting device may be such that the backscattered radio signal 504 occupy the same RF channel as the incident radio signal 502. Furthermore, the modulation frequencies at the transmitting device 100 are such that the backscattered radio signal 504 corresponding to a logical 0 and the backscattered radio signal 504 corresponding to a logical 1 do not overlap in the frequency domain.

Any one of the incident radio signal 502 and the backscattered radio signals 504 may be multicarrier signals, e.g., OFDM signals. The generating device 250 and/or the receiving device may support or operate according to IEEE 802.11a/g/n/ac/ax or MulteFire.

Figure 17:
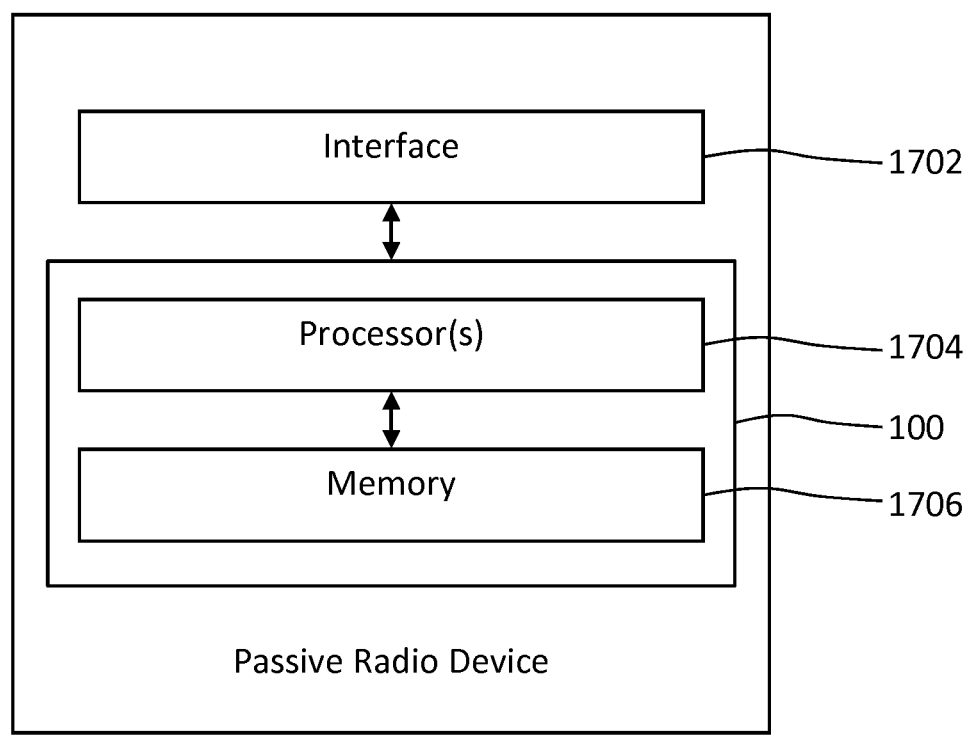
FIG. 17 shows a schematic block diagram of a further embodiment of the device of FIG. 1.

FIG. 17 shows a schematic block diagram for an embodiment of the device 100. The device 100 comprises one or more processors 1704 for performing the method 300 and memory 1706 coupled to the processors 1704. For example, the memory 1706 may be encoded with instructions that implement at least one of the modules 102 and 104.

The one or more processors 1704 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 1706, passive or semi-passive radio device functionality and/or data transmitter functionality. For example, the one or more processors 1704 may execute instructions stored in the memory 1706. Such functionality may include providing various features and steps discussed herein, including any of the benefits disclosed herein. The expression "the device being operative to perform an action" may denote the device 100 being configured to perform the action.

As schematically illustrated in FIG. 17, the device 100 may be embodied by a passive or semi-passive radio device 1700, e.g., functioning as a data transmitter and, optionally, as a data receiver. The radio device 1700 comprises a radio interface 1702 coupled to the device 100 for radio communication with one or more radio devices, access points and/or base stations.

Figure 18:
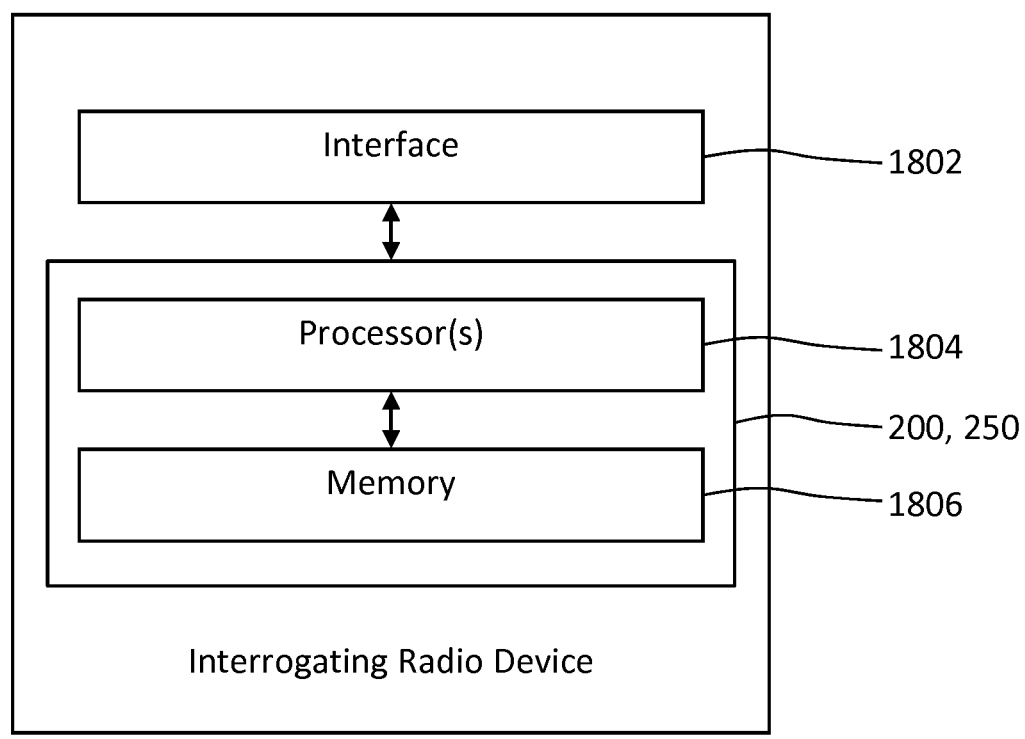
FIG. 18 shows a schematic block diagram of a further embodiment of the device of FIG. 2.

FIG. 18 shows a schematic block diagram for an embodiment of the receiving device 200 and/or the generating device 250. The device 200 and/or the device 250 comprises one or more processors 1804 for performing the method 400 and memory 1806 coupled to the processors 1804. For example, the memory 1806 may be encoded with instructions that implement at least one of the modules 202 and 204.

The one or more processors 1804 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 200 and/or the device 250, such as the memory 1806, data receiver functionality, multicarrier receiver functionality and/or multicarrier transmitter functionality. For example, the one or more processors 1804 may execute instructions stored in the memory 1806. Such functionality may include providing various features and steps discussed herein, including any of the benefits disclosed herein. The expression "the device being operative to perform an action" may denote the device 200 and/or the device 250 being configured to perform the action.

As schematically illustrated in FIG. 18, the device 200 and/or the device 250 may be embodied by an interrogating station 1800, e.g., functioning as a data receiver and, optionally, as a multi-tone transmitter. The interrogating station 1800 comprises a radio interface 1802 coupled to the device 200 and/or the device 250 for radio communication with one or more passive or semi-passive radio devices.

As has become apparent from above description, embodiments of the technique enable the utilization of a broadband RF generators, which may have advantages in terms of an increased output power and/or transmission reliability. In same or further embodiments, the RF generator and/or the data receiver may be implemented by modifying or extending wireless devices configured to operate according to the standards IEEE 802.11a/g/n/ac/ax and/or MulteFire.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of transmitting data from a passive radio device, the method comprising:
exposing an antenna of the passive radio device to an incident radio signal, a frequency domain representation of the incident radio signal comprising at least one muted gap between active subcarriers within a bandwidth of the incident radio signal; and
backscattering the incident radio signal from the antenna by modulating an impedance of the antenna according to the data using at least two different modulation frequencies that differ by less than the bandwidth.

2. The method of claim 1, wherein the frequency domain representation of the incident radio signal comprises at least two muted gaps within the bandwidth of the incident radio signal.

3. The method of claim 1, wherein the incident radio signal comprises at least one group of adjacent active subcarriers, and wherein the modulation frequencies differ by more than a group bandwidth of the at least one group.

4. The method of claim 3, further comprising:
measuring the group bandwidth in the incident radio signal; and
selecting the modulation frequencies according to the measured group bandwidth.

5. The method of claim 1, wherein the modulation frequencies differ by less than a gap bandwidth of the at least one muted gap.

6. The method of claim 5, further comprising:
measuring the gap bandwidth in the incident radio signal; and
selecting the modulation frequencies according to the measured gap bandwidth.

7. The method of claim 1, wherein the incident radio signal comprises at least two sets of active subcarriers, the sets being separated in the frequency domain representation by the at least one muted gap.

8. The method of claim 1, wherein each of the active subcarriers in the incident radio signal corresponds to a different subcarrier on a subcarrier frequency raster with uniform subcarrier spacing.

9. The method of claim 8, wherein each of the at least one muted gap in the incident radio signal corresponds to M or at least M muted subcarriers on the subcarrier frequency raster.

10. The method of claim 1, wherein for any pair of first and second modulation frequencies among the at least two different modulation frequencies there is at least one frequency component that is active in the backscattered radio signal resulting from the first modulation frequency and muted in the backscattered radio signal resulting from the second modulation frequency.

11. The method of claim 1, wherein for each of the at least two different modulation frequencies all frequency components that are active in the backscattered radio signal resulting from using the corresponding modulation frequency are muted in the backscattered radio signal resulting from using any other of the at least two different modulation frequencies.

12. The method of claim 1, wherein the backscattered radio signal overlaps in the frequency domain representation with the bandwidth of the incident radio signal.

13. The method of claim 1, wherein each of the modulation frequencies is equal to or less than the bandwidth of the incident radio signal.

14. The method of claim 1, wherein the backscattered radio signal is shifted in the frequency domain representation out of the bandwidth of the incident radio signal.

15. The method of claim 1, wherein the backscattered radio signal is shifted in the frequency domain relative to the incident radio signal by the modulation frequency used for the modulation, each of the modulation frequencies corresponding to a different modulation symbol, wherein a sequence of the modulation symbols is representative of the data.

16. A method of receiving data from a passive radio device, the method comprising:
  receiving a backscattered radio signal from an antenna of the passive radio device that is exposed to an incident radio signal, a frequency domain representation of the incident radio signal comprising at least one muted gap between active subcarriers within a bandwidth of the incident radio signal, the backscattered radio signal being frequency modulated according to the data using at least two different modulation frequencies that differ by less than the bandwidth;
  demodulating the backscattered radio signal including a Fourier transformation of the backscattered radio signal resulting in a plurality of frequency components;
  accumulating power over each of at least two disjoint sets of the frequency components; and
  determining the used modulation frequency based on the set of subcarriers with maximum accumulated power among the at least two sets.

17. A device for transmitting data from a passive radio device, the device comprising at least one processor and a memory, said memory comprising instructions executable by said at least one processor, whereby the device is operative to:
  expose an antenna of the passive radio device to an incident radio signal, a frequency domain representation of the incident radio signal comprising at least one muted gap between active subcarriers within a bandwidth of the incident radio signal; and
  backscatter the incident radio signal from the antenna by modulating an impedance of the antenna according to the data using at least two different modulation frequencies that differ by less than the bandwidth.

18. A device for receiving data from a passive radio device, the device comprising at least one processor and a memory, said memory comprising instructions executable by said at least one processor, whereby the device is operative to:
  receive a backscattered radio signal from an antenna of the passive radio device that is exposed to an incident radio signal, a frequency domain representation of the incident radio signal comprising at least one muted gap between active subcarriers within a bandwidth of the incident radio signal, the backscattered radio signal being frequency modulated according to the data using at least two different modulation frequencies that differ by less than the bandwidth, and
  demodulate the backscattered radio signal including a correlation of the backscattered radio signal with at least two power spectral densities each associated with a different one of the at least two modulation frequencies, wherein a maximum among the correlations indicates the used modulation frequency.

* * * * *